US007577260B1

(12) United States Patent
Hooley et al.

(10) Patent No.: US 7,577,260 B1
(45) Date of Patent: Aug. 18, 2009

(54) METHOD AND APPARATUS TO DIRECT SOUND

(75) Inventors: Anthony Hooley, Cambridge (GB); Paul Thomas Troughton, Cambridge (GB); Angus Gavin Goudie, Cambridge (GB); Irving Alexander Bienek, Cambridge (GB); Paul Raymond Windle, Saffron Waldon (GB)

(73) Assignee: Cambridge Mechatronics Limited, Cambridge (GB)

(*) Notice: Subject to any disclaimer, the term of this patent is extended or adjusted under 35 U.S.C. 154(b) by 516 days.

(21) Appl. No.: 10/089,025

(22) PCT Filed: Sep. 29, 2000

(86) PCT No.: PCT/GB00/03742

§ 371 (c)(1), (2), (4) Date: Jun. 21, 2002

(87) PCT Pub. No.: WO01/23104

PCT Pub. Date: Apr. 5, 2001

(30) Foreign Application Priority Data

| | | |
|---|---|---|
| Sep. 29, 1999 | (GB) | 9922919.7 |
| May 19, 2000 | (GB) | 0011973.5 |
| Sep. 13, 2000 | (GB) | 0022479.0 |

(51) Int. Cl.
*H04B 3/00* (2006.01)

(52) U.S. Cl. ............................ 381/77; 381/80; 381/97; 381/307

(58) Field of Classification Search ................. 381/307, 381/17, 97, 300, 335, 77, 79, 80; 367/129
See application file for complete search history.

(56) References Cited

U.S. PATENT DOCUMENTS 3,992,586 A 11/1976 Jaffe (Continued)

FOREIGN PATENT DOCUMENTS

DE 966384 C 8/1957

(Continued)

OTHER PUBLICATIONS

Komiyama, Setsu; "Distance Control of Sound Images for 3D TV"; NHK Laboratories Note, Aug. 1992; pp. 1-11; vol. 406; NHK Technical Research Laboratories; Tokyo.

(Continued)

*Primary Examiner*—Vivian Chin
*Assistant Examiner*—Jason R Kurr
(74) *Attorney, Agent, or Firm*—Gerry J. Elman; Elman Technology Law, P.C.

(57) ABSTRACT

The invention relates to sonic steerable antennae and their use to achieve a variety of effects. The invention comprises a method and apparatus for taking an input signal, replicating it a number of times and modifying each of the replicas before routing them to respective output transducers such that a desired sound field is created. This sound field may comprise a directed beam, focus beam or a simulated origin. Further, "anti-sound" may be directed so as to create nulls (quiet spots) in an already existing sound field. The input signal replicas may also be modified in way which changes their amplitude or they may be filtered to provide the desired delaying. Reflective or resonant surfaces may be used to achieve a surround sound effect, a microphone may be located in front of an array of loudspeakers, beams of light may be used to identify the present focal position, a limiting device may be used to ensure that clipping or distortion is reduced when more than one input signal is output by the same device and the concept of beam directivity may be used to achieve input nulls or beams in a microphone made up of an array of input transducers. Further, sound field shaping information may be associated with an audio signal to be broadcast.

19 Claims, 22 Drawing Sheets

U.S. PATENT DOCUMENTS

| | | | | | |
|---|---|---|---|---|---|
| 3,996,561 | A | | 12/1976 | Kowal et al. | |
| 4,042,778 | A | | 8/1977 | Clinton | |
| 4,190,739 | A | | 2/1980 | Torffield | 179/1 GA |
| 4,256,922 | A | | 3/1981 | Gorike | |
| 4,283,600 | A | | 8/1981 | Cohen | |
| 4,305,296 | A | | 12/1981 | Green et al. | 73/626 |
| 4,330,691 | A | | 5/1982 | Gordon | |
| 4,332,018 | A | | 5/1982 | Sternberg et al. | |
| 4,388,493 | A | | 6/1983 | Maisel | 179/1 GD |
| 4,399,328 | A | * | 8/1983 | Franssen et al. | 381/1 |
| 4,472,834 | A | * | 9/1984 | Yamamuro et al. | 381/61 |
| 4,515,997 | A | | 5/1985 | Stinger, Jr. | |
| 4,518,889 | A | | 5/1985 | 'T Hoen | |
| 4,653,505 | A | | 3/1987 | Iinuma | 128/660 |
| 4,769,848 | A | | 9/1988 | Eberback | |
| 4,773,096 | A | | 9/1988 | Kirn | |
| 4,972,381 | A | | 11/1990 | Mitchell et al. | 367/13 |
| 4,980,871 | A | | 12/1990 | Sieber et al. | 367/127 |
| 4,984,273 | A | | 1/1991 | Aylward et al. | |
| 5,051,799 | A | | 9/1991 | Paul et al. | |
| 5,109,416 | A | * | 4/1992 | Croft | 381/304 |
| 5,131,051 | A | | 7/1992 | Kishinaga et al. | 381/82 |
| 5,166,905 | A | | 11/1992 | Currie | 367/19 |
| 5,227,591 | A | | 7/1993 | Tarkkonen | |
| 5,233,664 | A | | 8/1993 | Yanagawa et al. | |
| 5,287,531 | A | | 2/1994 | Rogers, Jr. et al. | |
| 5,313,172 | A | | 5/1994 | Vagher | |
| 5,313,300 | A | | 5/1994 | Rabile | |
| 5,438,624 | A | | 8/1995 | Lewiner et al. | 381/71 |
| 5,488,956 | A | | 2/1996 | Bartelt et al. | |
| 5,491,754 | A | | 2/1996 | Jot et al. | |
| 5,517,200 | A | | 5/1996 | McAdam et al. | 342/360 |
| 5,555,306 | A | | 9/1996 | Gerzon | |
| 5,581,618 | A | * | 12/1996 | Satoshi et al. | 381/17 |
| 5,742,690 | A | | 4/1998 | Edgar | |
| 5,745,435 | A | | 4/1998 | Fage et al. | 367/13 |
| 5,751,821 | A | | 5/1998 | Smith | |
| 5,763,785 | A | | 6/1998 | Chiang | 73/609 |
| 5,802,190 | A | * | 9/1998 | Ferren | 381/182 |
| 5,809,150 | A | * | 9/1998 | Eberbach | 381/300 |
| 5,822,438 | A | * | 10/1998 | Sekine et al. | 381/17 |
| 5,832,097 | A | | 11/1998 | Armstrong et al. | |
| 5,834,647 | A | | 11/1998 | Gaudriot et al. | 73/570 |
| 5,841,394 | A | | 11/1998 | Sterns et al. | 342/174 |
| 5,859,915 | A | | 1/1999 | Norris | 381/75 |
| 5,867,123 | A | | 2/1999 | Geyh et al. | 342/372 |
| 5,870,484 | A | * | 2/1999 | Greenberger | 381/300 |
| 5,885,129 | A | | 3/1999 | Norris | |
| 5,953,432 | A | * | 9/1999 | Yanagawa et al. | 381/335 |
| 5,963,432 | A | | 10/1999 | Crowley | |
| 6,002,776 | A | | 12/1999 | Bhadkamkar et al. | |
| 6,005,642 | A | | 12/1999 | Meisner et al. | |
| 6,084,974 | A | | 7/2000 | Niimi | 381/104 |
| 6,112,847 | A | | 9/2000 | Lehman | |
| 6,122,223 | A | | 9/2000 | Hossack | |
| 6,128,395 | A | | 10/2000 | De Vries | |
| 6,154,553 | A | | 11/2000 | Taylor | |
| 6,169,806 | B1 | | 1/2001 | Kimura et al. | |
| 6,243,476 | B1 | | 6/2001 | Gardner | |
| 6,263,083 | B1 | * | 7/2001 | Weinreich | 381/97 |
| 6,294,905 | B1 | | 9/2001 | Schwartz | |
| 6,373,955 | B1 | | 4/2002 | Hooley | |
| 6,556,682 | B1 | | 4/2003 | Gilloire et al. | |
| 6,807,281 | B1 | | 10/2004 | Sasaki et al. | |
| 6,834,113 | B1 | | 12/2004 | Liljehag et al. | |
| 6,856,688 | B2 | | 2/2005 | Cromer et al. | |
| 6,967,541 | B2 | | 11/2005 | Hooley | |
| 7,092,541 | B1 | | 8/2006 | Eberbach | |
| 2001/0007591 | A1 | | 7/2001 | Pompei | |
| 2001/0012369 | A1 | | 8/2001 | Marquiss | |
| 2001/0038702 | A1 | | 11/2001 | Lavoie et al. | |
| 2001/0043652 | A1 | | 11/2001 | Hooley | |
| 2002/0126854 | A1 | | 9/2002 | Norris et al. | |
| 2002/0131608 | A1 | | 9/2002 | Lobb et al. | |
| 2002/0159336 | A1 | | 10/2002 | Brown et al. | |
| 2003/0091203 | A1 | | 5/2003 | Croft, III et al. | |
| 2004/0151325 | A1 | | 8/2004 | Hooley et al. | |
| 2004/0264707 | A1 | | 12/2004 | Yang et al. | |
| 2005/0041530 | A1 | | 2/2005 | Goudie et al. | |
| 2005/0089182 | A1 | | 4/2005 | Troughton et al. | |
| 2005/0207590 | A1 | | 9/2005 | Niehoff et al. | |
| 2005/0265558 | A1 | | 12/2005 | Neoran | |
| 2006/0204022 | A1 | | 9/2006 | Hooley et al. | |
| 2007/0154019 | A1 | | 7/2007 | Kim | |

FOREIGN PATENT DOCUMENTS

| | | | |
|---|---|---|---|
| DE | 40 33 068 | A1 | 4/1991 |
| DE | 31 42 462 | | 5/1992 |
| DE | 44 28 500 | A1 | 3/1995 |
| DE | 43 43 807 | A1 | 6/1995 |
| EP | 0 025 118 | | 3/1982 |
| EP | 0 323 110 | A2 | 7/1989 |
| EP | 0 351 055 | A1 | 1/1990 |
| EP | 0 492 015 | | 7/1992 |
| EP | 0521655 | A1 | 1/1993 |
| EP | 0 591 899 | | 4/1994 |
| EP | 0 642 032 | | 3/1995 |
| EP | 0807990 | A1 | 11/1997 |
| EP | 1 026 663 | A2 | 8/2000 |
| EP | 1061769 | A2 | 12/2000 |
| EP | 1122973 | A2 | 8/2001 |
| EP | 1199907 | A | 4/2002 |
| EP | 1348954 | A1 | 10/2003 |
| ES | 2 116 929 | | 7/1998 |
| FR | 2628335 | | 9/1989 |
| GB | 1 571 714 | | 7/1980 |
| GB | 1 603 201 | | 11/1981 |
| GB | 2077552 | A | 12/1981 |
| GB | 2094101 | A | 9/1982 |
| GB | 2209229 | A | 5/1989 |
| GB | 2320351 | A | 6/1989 |
| GB | 2239763 | A | 7/1991 |
| GB | 2 243 040 | | 10/1991 |
| GB | 2 259 364 | | 3/1993 |
| GB | 2 259 426 | | 3/1993 |
| GB | 2 273 848 | | 6/1994 |
| GB | 2 277 152 | | 10/1994 |
| GB | 2 290 380 | | 12/1995 |
| GB | 2303019 | A | 2/1997 |
| GB | 2 326 559 | | 12/1998 |
| GB | 2 332 052 | | 6/1999 |
| GB | 2333842 | A | 8/1999 |
| GB | 2 340 351 | | 2/2000 |
| GB | 2 345 967 | | 7/2000 |
| GB | 2358117 | A | 7/2001 |
| JP | 01-061601 | | 9/1980 |
| JP | 57-068991 | | 4/1982 |
| JP | 61-057198 | | 8/1984 |
| JP | 59-186498 | | 10/1984 |
| JP | 59-179743 | | 3/1986 |
| JP | 61-253996 | | 11/1986 |
| JP | 62076958 | | 4/1987 |
| JP | 61-152498 | | 1/1988 |
| JP | 63-009300 | | 1/1988 |
| JP | 63014588 | | 1/1988 |
| JP | 62-068410 | | 9/1988 |
| JP | 63-234699 | | 9/1988 |
| JP | 62-103315 | | 11/1988 |
| JP | 63-269699 | | 11/1988 |
| JP | 62-133476 | | 12/1988 |
| JP | 63-300699 | | 12/1988 |
| JP | 64-061601 | | 3/1989 |
| JP | 02013097 | | 1/1990 |

| | | | |
|---|---|---|---|
| JP | 02-142285 | | 5/1990 |
| JP | 02-239798 | | 9/1990 |
| JP | 02-257798 | | 10/1990 |
| JP | 01-297716 | | 7/1991 |
| JP | 01-298457 | | 7/1991 |
| JP | 03-159400 | | 7/1991 |
| JP | 03-159500 | | 7/1991 |
| JP | 03-169200 | | 7/1991 |
| JP | 05-091596 | | 9/1991 |
| JP | 02-249432 | | 4/1992 |
| JP | 04-127700 | | 4/1992 |
| JP | 0412770 | | 4/1992 |
| JP | 04-132499 | | 5/1992 |
| JP | 03-004842 | | 11/1992 |
| JP | 04-313996 | | 11/1992 |
| JP | 03-197864 | | 2/1993 |
| JP | 05-041897 | | 2/1993 |
| JP | 03-252315 | | 4/1993 |
| JP | 05-191898 | | 7/1993 |
| JP | 04-008975 | | 8/1993 |
| JP | 05-199598 | * | 8/1993 |
| JP | 05199583 | | 8/1993 |
| JP | 04-153224 | | 12/1993 |
| JP | 05-344584 | | 12/1993 |
| JP | 06-038289 | | 2/1994 |
| JP | 04-214144 | | 3/1994 |
| JP | 06-062488 | | 3/1994 |
| JP | 06178379 | | 6/1994 |
| JP | 05-001321 | | 7/1994 |
| JP | 06-205496 | | 7/1994 |
| JP | 05-010123 | | 8/1994 |
| JP | 06-225379 | | 8/1994 |
| JP | 06318087 | | 11/1994 |
| JP | 06-334459 | | 12/1994 |
| JP | 07-007788 | | 1/1995 |
| JP | 05-301465 | | 6/1995 |
| JP | 07-154893 | | 6/1995 |
| JP | 07-193896 | | 7/1995 |
| JP | 05-349872 | | 8/1995 |
| JP | 07-203581 | | 8/1995 |
| JP | 08-051690 | | 2/1996 |
| JP | 08-181962 | | 7/1996 |
| JP | 09-200439 | | 7/1997 |
| JP | 10-285683 | | 10/1998 |
| JP | 11027604 | | 1/1999 |
| JP | 11-046400 | | 2/1999 |
| JP | 11030525 | | 2/1999 |
| JP | 2002-023300 | | 1/2000 |
| JP | 2000-217197 | | 8/2000 |
| JP | 2000-295686 | | 10/2000 |
| JP | 2000-295697 | | 10/2000 |
| JP | 2001-069591 | | 3/2001 |
| JP | 2001-078290 | | 3/2001 |
| JP | 2001-095082 | | 4/2001 |
| SU | 1 678 327 | | 9/1991 |
| WO | 95/20214 | A1 | 7/1995 |
| WO | 96 31086 | | 3/1996 |
| WO | 96/14723 | | 5/1996 |
| WO | 97/32449 | | 9/1997 |
| WO | WO 98-58522 | | 12/1998 |
| WO | 99/00780 | | 1/1999 |
| WO | WO 99-35881 | | 7/1999 |
| WO | 99/41943 | A1 | 8/1999 |
| WO | 01/08449 | A1 | 2/2001 |
| WO | 01/23104 | A2 | 4/2001 |
| WO | 01/52437 | A1 | 7/2001 |
| WO | 02/41664 | A2 | 5/2002 |
| WO | 02/078388 | A2 | 10/2002 |
| WO | 03/019125 | A1 | 3/2003 |
| WO | 03/026343 | A2 | 3/2003 |
| WO | 03/034780 | A2 | 4/2003 |
| WO | 03/059005 | A2 | 7/2003 |
| WO | 03/071827 | A2 | 8/2003 |
| WO | 2004/066673 | A1 | 8/2004 |
| WO | 2004-075601 | A1 | 9/2004 |
| WO | 2005/027514 | A1 | 3/2005 |
| WO | 2005/086526 | A1 | 9/2005 |
| WO | 2006/005938 | A1 | 1/2006 |
| WO | 2006/005948 | A1 | 1/2006 |
| WO | 2006/016156 | A1 | 2/2006 |
| WO | 2006/030198 | A1 | 3/2006 |
| WO | 2007/007083 | A1 | 1/2007 |

OTHER PUBLICATIONS

"Wageform Inversion for Individual Ambient Sound Control"; IBM Technical Disclosure Bulletin; Sep. 1993; pp. 573-540; vol. 36; No. 9A; IBM Corporation; New York.

Johan Van Der Werff, "Design and implementation of a sound column with exceptional properties", preprint of 96th AES Convention, Amsterdam, No. 3835, XP007901141, Feb. 26, 1994.

Troughton, Paul, Convenient Multi-Channel Sound In The Home, Audio Delivery: The Changing Home Experience—AES 17th UK Conference 2002, pp. 102-105.

* cited by examiner

Fig.27.
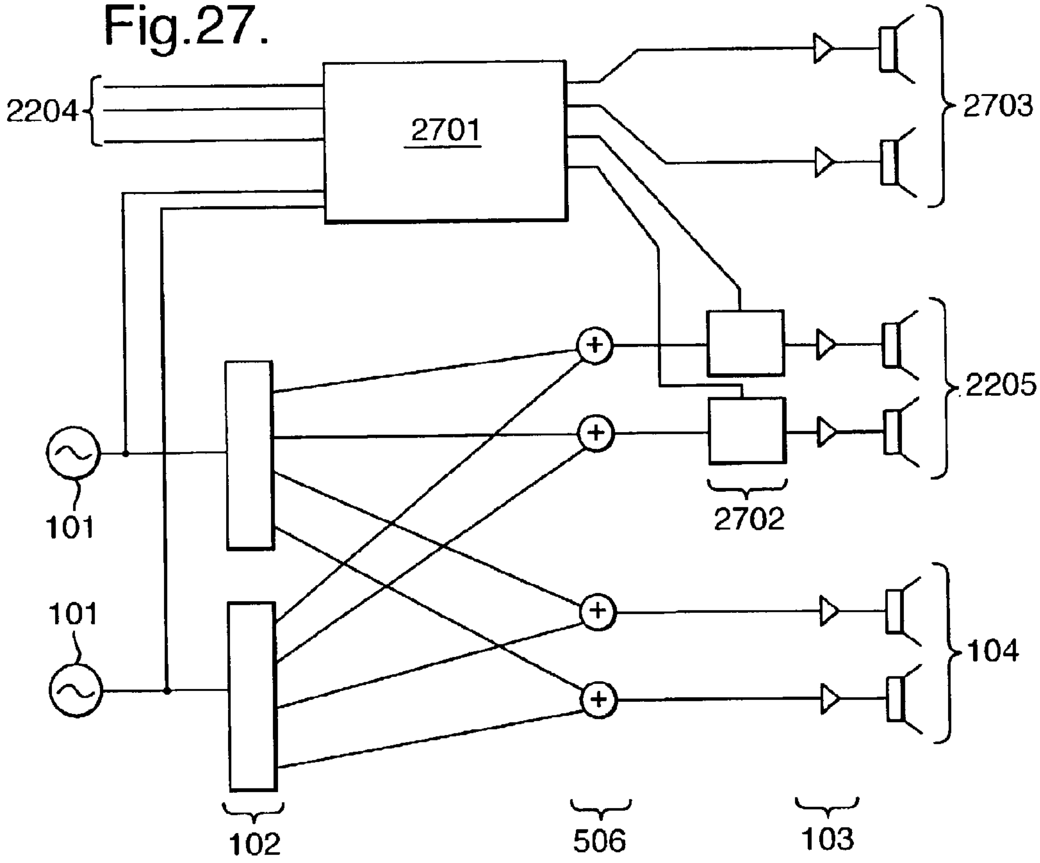
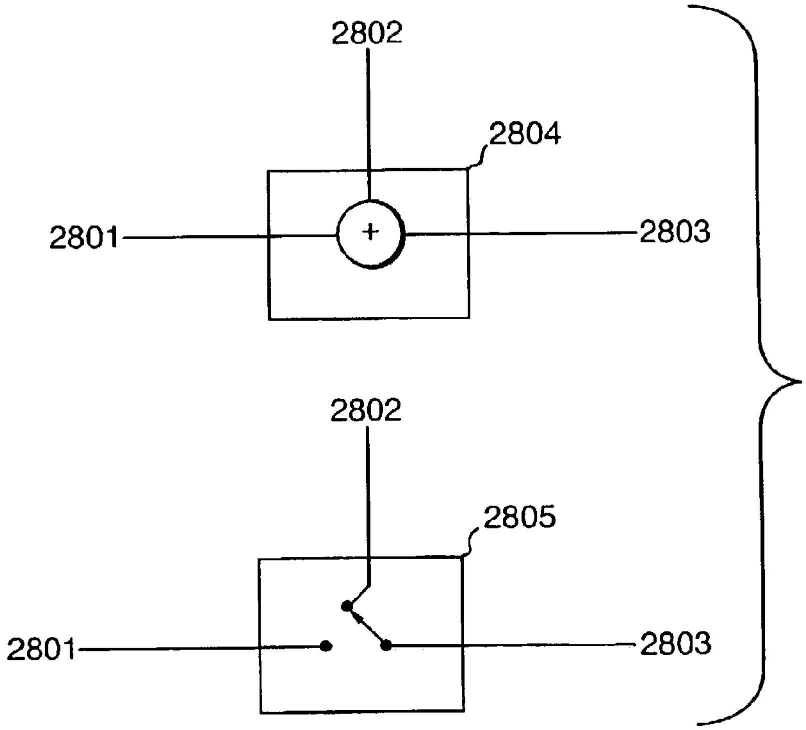
Fig.28.

METHOD AND APPARATUS TO DIRECT SOUND

This invention relates to steerable acoustic antennae, and concerns in particular digital electronically-steerable acoustic antennae.

Phased array antennae are well known in the art in both the electromagnetic and the ultrasonic acoustic fields. They are less well known, but exist in simple forms, in the sonic (audible) acoustic area. These latter are relatively crude, and the invention seeks to provide improvements related to a superior audio acoustic array capable of being steered so as to direct its output more or less at will.

WO 96/31086 describes a system which uses a unary coded signal to drive a an array of output transducers. Each transducer is capable of creating a sound pressure pulse and is not able to reproduce the whole of the signal to be output.

A first aspect of the present invention addresses the problem that it is desirable to be able to shape a sound field.

In accordance with the first aspect, there is provided a method of directing sound waves derived from a signal using an array of output transducers, said method comprising:

obtaining, in respect of each output transducer, a delayed replica of the signal, the delayed replica being delayed by a respective delay selected in accordance with the position in the array of the respective transducer and a given direction so as to direct sound waves derived from said signal in said direction;

routing the delayed replicas to the respective output transducers.

Also in accordance with the first aspect of the invention there is a provided a method of creating a sound field having a simulated origin using an array of output transducers, said method comprising:

obtaining, in respect of each output transducer, a delayed replica of an input signal, the delayed replica being delayed by a respective delay selected in accordance with the position in the array of the respective transducer and the position of the simulated origin so as to create a sound field which substantially appears to originate at said simulated origin; and routing the delayed replicas to the respective output transducers.

Further, in accordance with the first aspect of the invention, there is provided an apparatus for directing sound waves, said apparatus comprising:

an array of output transducers;

replication and delay means arranged to obtain, in respect of each output transducer, a delayed replica of the signal, the delayed replica being delayed by a respective delay selected in accordance with the position in the array of the respective transducer and a given direction so as to direct sound waves derived from said signal to be directed substantially in said direction; and means for routing the delayed replicas to the respective output transducers.

Furthermore, in accordance with the first aspect of the invention, there is provided an apparatus to create a sound field having a simulated origin, said apparatus comprising:

an array of output transducers;

replication and delay means arranged to obtain, in respect of each output transducer, a delayed replica of an input signal, the delayed replica being delayed by a respective delay selected in accordance with the position in the array of the respective transducer and the position of the simulated origin so as to create a sound field which appears to originate at said simulated origin; and means for routing the delayed replicas to the respective output transducers.

Thus, there is provided a method and apparatus for shaping a sound field in an efficient manner.

A second aspect of the invention addresses the problem that it is often desirable to be able to cancel sound waves in some particular direction. This aspect is directed towards the use of a transducer array to cancel sound waves at specified positions.

According to the second aspect of the invention, there is provided a method of cancelling sound waves derived from a signal at a null position using an array of output transducers, said method comprising:

obtaining, in respect of each output transducer, a delayed replica of the signal to be cancelled, the delayed replica being delayed by a respective delay selected in accordance with the position in the array of the respective transducer and the null position;

scaling and inverting each of said delayed replica signals; and routing the scaled and inverted delayed replicas to the respective output transducers so as to at least partially cancel a sound field at said null position.

Further, in accordance with the second aspect of the present invention, there is provided an apparatus for cancelling sound waves at a null position, said apparatus comprising:

an array of output transducers;

replication and delay means arranged to obtain, in respect of each output transducer, a delayed replica of the signal to be cancelled, the delayed replica being delayed by a respective delay selected in accordance with the position in the array of the respective transducer and the null position;

scaler means and inverter means for scaling and inverting each of said delayed replica signals;

means to route the scaled and inverted delayed replicas to the respective output transducers so as to at least partially cancel a sound field at said null position.

This aspect of the invention allows sound waves to be cancelled efficiently.

A third aspect of the present invention addresses the problem that traditional stereo or surround sound devices have many wires and loudspeaker units with correspondingly set-up times. This aspect therefore relates to the creation of a true stereo or surround-sound field without the wiring and separated loudspeakers traditionally associated with stereo and surround-sound systems.

Accordingly, the third aspect of the invention provides a method of causing plural input signals representing respective channels to appear to emanate from respective different positions in space, said method comprising:

providing a sound reflective or resonant surface at each of said positions in space;

providing an array of output transducers distal from said positions in space; and directing, using said array of output transducers, sound waves of each channel towards the respective position in space to cause said sound waves to be re-transmitted by said reflective or resonant surface;

said step of directing comprising:

obtaining, in respect of each transducer, a delayed replica of each input signal delayed by a respective delay selected in accordance with the position in the array of the respective output transducer and said respective position in space such that the sound waves of the channel are directed towards the position in space in respect of that channel;

summing, in respect of each transducer, the respective delayed replicas of each input signal to produce an output signal; and routing the output signals to the respective transducers.

Further, in accordance with the third aspect of the invention, there is provided an apparatus for causing plural input signals representing respective channels to appear to emanate from respective different positions in space, said apparatus comprising:

a sound reflective or resonant surface at each of said positions in space;

an array of output transducers distal from said positions in space; and a controller for directing, using said array of output transducers, sound waves of each channel towards that channel's respective position in space such that said sound waves are re-transmitted by said reflective or resonant surface;

said controller comprising:

replication and delay means arranged to obtain, in respect of each transducer, a delayed replica of the input signal delayed by a respective delay selected in accordance with the position in the array of the respective output transducer and said respective position in space such that the sound waves of the channel are directed towards the position in space in respect of that input signal;

adder means arranged to sum, in respect of each transducer, the respective delayed replicas of each input signal to produce an output signal; and means to route the output signals to the respective transducers such that the channel sound waves are directed towards the position in space in respect of that input signal.

A fourth aspect of the invention addresses the problem that it may be useful to know exactly where a transducer is located so that some special effects can be achieved.

In accordance with the fourth aspect of the invention there is provided a method of detecting the position of an input transducer in the vicinity of an array of output transducers, said method comprising:

outputting respective distinguishable sonic test signals from at least three output transducers of said array;

receiving each of said test signals at said input transducer;

detecting the time between outputting each test signal and receiving it at the input transducer; and using said detected times to calculate the apparent position of said input transducer by triangulation.

Further in accordance with the fourth aspect of the invention there is provided a method of detecting the position of an output transducer situated in the vicinity of an array of input transducers, said method comprising:

outputting a sonic test signal from said output transducer;

receiving said test signal at least three input transducers in said array;

detecting the time between outputting said test signal and receiving it at each input transducer; and using said detected times to calculate the apparent position of said output transducer by triangulation.

Also in accordance with the fourth aspect of the invention there is provided an apparatus operable to detect the position of an input transducer situated in the vicinity of an array of output transducers, said apparatus comprising:

an array of output transducers;

an input transducer;

a controller connected to said array of output transducers and said input transducer, said controller being arranged to route respective distinguishable sonic test signals to at least three of said output transducers and to detect the time between outputting each test signal and receiving it at the input transducer so as to calculate the apparent position of said input transducer by triangulation.

Furthermore in accordance with the fourth aspect of the invention there is provided an apparatus operable to detect the position of an output transducer situated in the vicinity of an array of input transducers, said apparatus comprising:

an array of input transducers;

an output transducer;

a controller connected to said array of input transducers and said output transducer, said controller being arranged to route a sonic test signal to said output transducer and to detect the time between outputting said test signal and receiving it at least three of said input transducers so as to calculate the apparent position of said input transducer by triangulation.

This aspect therefore allows to the location of the position of a microphone near an array of loudspeakers or the position of a loudspeaker near an array of microphones. This locating function may be usefully combined with the sound direction and null positioning functions.

A fifth aspect of the invention relates to shaping a sound field in respect of a single frequency band of an input signal only.

In accordance with the fifth aspect of the invention there is provided a method of transmitting sound waves using an array of output transducers, said method comprising:

frequency dividing an input signal into at least two frequency bands;

obtaining, in respect of each output transducer of said array of output transducers, a delayed replica of a first band of the input signal delayed by a respective delay selected in accordance with the position in the array of the respective output transducer such that the sound field derived from the first band of said input signal is shaped in a desired way;

obtaining, in respect of each output transducer, a replica of a second band of the input signal;

summing respective replicas of said first and second bands to create respective output signals in respect of each transducer; and routing said output signals to respective transducers.

Further in accordance with the fifth aspect of the invention there is provided a method of transmitting sound waves using an array of output transducers, said method comprising:

frequency dividing an input signal into at least two frequency bands;

obtaining, in respect of each output transducer of said array of output transducers, a delayed replica of a first band of the input signal delayed by a respective delay selected in accordance with the position in the array of the respective output transducer and a first selected direction;

scaling and inverting said delayed replicas of said first band of said input signal;

obtaining, in respect of each output transducer, a replica of a second band of the input signal;

summing respective replicas of said first and second bands to create respective output signals in respect of each transducer; and routing said output signals to respective transducers such that sound waves derived from the first band of said input signal are at least partially cancelled in a particular direction.

Also in accordance with the fifth aspect of the invention there is provided an apparatus to transmit sound waves comprising:

an array of output transducers;

frequency divider means for dividing an input signal into at least two frequency bands;

replication and delay means to obtain, in respect of each output transducer of said array of output transducers, a delayed replica of a first band of the input signal delayed by a respective delay selected in accordance with the position in the array of the respective output transducer;

said replication and delay means being arranged further to obtain, in respect of each output transducer, a replica of a second band of the input signal;

adder means for summing respective replicas of said first and second bands to create respective output signals in respect of each transducer; and means to route said output signals to respective transducers.

Furthermore in accordance with the fifth aspect of the invention there is provided an apparatus to transmit sound waves comprising:

an array of output transducers;

frequency divider means for frequency dividing an input signal into at least two frequency bands;

replication and delay means to obtain, in respect of each output transducer of said array of output transducers, a delayed replica of a first band of the input signal delayed by a respective delay selected in accordance with the position in the array of the respective output transducer and a first selected direction;

scaler means and inverter means for scaling and inverting said delayed replicas of said first band of said input signal;

said replicator and delaying means being arranged further to obtain, in respect of each output transducer, a replica of a second band of the input signal;

an adder for summing respective replicas of said first and second bands to create respective output signals in respect of each transducer; and means to route said output signals to respective transducers such that sound waves derived from the first band of said input signal are at least partially cancelled in a particular direction.

The above described frequency splitting is particularly useful when nulling because it is desirable not to transmit anti-beams in respect of low frequencies because it can cause cancellation over an excessively large area.

The sixth aspect of the invention addresses the problem that an operator may have difficulty in locating where sound waves are focussed, and thus has difficulty in setting up the system.

In accordance with the sixth aspect of the present invention there is provided a method of indicating the position of focus of sound, said method comprising:

shining a first beam of light in a first direction and a second beam of light in a second direction from separated sources so that the beams intersect at a first position in space; and focussing first sound waves derived from a first input signal at said first position in space.

Further in accordance with the sixth aspect of the present invention there is provided an apparatus for allowing a user to select where sound waves are focussed, said apparatus comprising:

at least one output transducer arranged to receive a first input signal and output sound waves derived from said first input signal;

a first light source for shining a first light beam in a selectable first direction;

a second light source for shining a second light beam in a selectable second direction; and a controller connected to said output transducer and said first and second light sources, said controller controlling said first and second directions in response to user selections and controlling said at least one output transducer to cause sound waves derived from said first input signal to be focussed at a first position in space where said light beams intersect.

The sixth aspect of the invention allows the use of visible light beams to indicate where a signal is being focussed. This is particularly useful when setting up a system to achieve a desired effect.

A seventh aspect of the invention addresses the problem that signals can be clipped or distorted when more than one input signal is routed to a output transducer.

In accordance with the seventh aspect of the present invention there is provided a method of limiting at least one output signal generated from a first and second signal, said method comprising:

windowing said first signal to create a first windowed portion comprising consecutive samples of said first signal;

determining the magnitude of the largest sample in said windowed portion of said first signal;

windowing said second signal to create a second windowed portion comprising consecutive samples of said second signal;

determining the magnitude of the largest sample in said windowed portion of said second signal;

summing together said largest samples from said first and second windowed portions to obtain a first control signal;

attenuating the magnitude of said first and second signals in accordance with the magnitude of said control signal; and generating said at least one output signal from said first and second signals.

Further in accordance with the seventh aspect of the present invention there is provided a signal limiting device comprising:

a first buffer for storing a series of consecutive samples of a first signal;

a second buffer for storing a series of consecutive samples of a second signal;

analysing means for determining the maximum value stored in each buffer at each sampling clock period;

an adder for adding said maximum values so as to obtain a control signal;

an attenuator for attenuating each of said first and second signals by an amount in accordance with said control signal; and means to generate an output signal from said first and second signals.

Thus, the seventh aspect provides that input signals are appropriately scaled to avoid any clipping or distortion in a simple and effective manner.

An eighth aspect of the invention addresses the problem that output transducers of an array may fail causing undesirable beam steering effects. This aspect therefore relates to the detection of, and mitigation of the effects of, a failed output transducer in an array.

In accordance with the eighth aspect of the invention there is provided a method of detecting failed transducers in an array of output transducers, said method comprising:

routing a test signal to each output transducer of the array; and analysing a signal obtained at an input transducer in the vicinity of said array of output transducers to determine whether or not each output transducer has failed.

A ninth aspect of the invention addresses the problem that an operator is required to select where beams are steered to or where sound appears to come from.

In accordance with the ninth aspect of the invention there is provided a method of reproducing an audio signal, said method comprising:

decoding an information signal associated with said audio signal:

processing said audio signal according to the information signal decoded in said decoding steps:

reproducing said processed audio signal.

Also in accordance with the ninth aspect of the invention there is provided a method comprising:

deciding on how a sound field comprising an audio signal should be shaped during reproduction; and coding said information signal according the result of said decision.

Further in accordance with the ninth aspect of the invention there is provided a device for reproducing an audio signal comprising:

an input terminal for inputting an audio signal;

an input terminal for inputting an information signal;

means of decoding the information signal;

a replicator and delaying means arranged to obtain, in respect of each output transducer of an array of output transducers, a delayed replica of the input signal delayed by a respective delay selected in accordance with the position in the array of the respective output transducer and in accordance with the decoded information signal;

means to route each of said delayed replica audio signals to a respective output transducer so that a sound field is achieved in accordance with said information signal.

Furthermore in accordance with the ninth aspect of the invention there is provided a decoder comprising:

means to interface with a conventional output transducer driver;

means to receive a plurality of audio signals and a plurality of associated information signals;

means for decoding said information signal and using the results of said decoding to route said audio signals to said output transducer driver such that a desired effect is achieved with conventional output transducers.

This aspect therefore relates to an advantageous way of storing audio signals to be reproduced with an array of output transducers which allows sound field shaping information to be recorded and also allows back-compatibility with conventional reproducing devices. Thus, an operator is not required to shape the sound field every time a signal is reproduced (for example in a cinema).

A tenth aspect of the invention addresses the problem that it can be difficult to design sound fields given a number of possibly conflicting restraints. This aspect therefore relates to the design of sound fields to be output by an array of transducers. In particular, it relates to the selection of appropriate delay amounts and filter coefficients to achieve desired sound effects according to a given priority.

In accordance with the tenth aspect of the invention there is provided a method of designing a sound field desired to be created by an array of output transducers, said method comprising:

identifying an area for which substantially even coverage is desired;

identifying an area for which minimal coverage in a particular frequency band is desired;

prioritising the above identifications in order of importance;

identifying an amount by which attempted fulfilment of the second priority may detriment the fulfilment of the first priority; and selecting, in respect of each output transducer of said array of output transducers, coefficients used to filter an input signal routed to the respective output transducer such that a directional sound field will be obtained, the sound field being such that the first priority is fulfilled within practical constraints and practical fulfilment of the second priority detriments fulfilment of the first priority only by the amount identified.

The disclosure provided by the claims of WO 01/23104, namely pages 64-109, is hereby incorporated by reference.

Generally, the invention is applicable to a preferably fully digital steerable acoustic phased array antenna (a Digital Phased-Array Antennae, or DPAA) system comprising a plurality of spatially-distributed sonic electroacoustic transducers (SETs) arranged in a two-dimensional array and each connected to the same digital signal input via an input signal Distributor which modifies the input signal prior to feeding it to each SET in order to achieve the desired directional effect.

The various possibilities inherent in this, and the versions that are actually preferred, will be seen from the following:—

The SETs are preferably arranged in a plane or curved surface (a Surface), rather than randomly in space. They may also, however, be in the form of a 2-dimensional stack of two or more adjacent sub-arrays—two or more closely-spaced parallel plane or curved surfaces located one behind the next.

Within a Surface the SETs making up the array are preferably closely spaced, and ideally completely fill the overall antenna aperture. This is impractical with real circular-section SETs but may be achieved with triangular, square or hexagonal section SETs, or in general with any section which tiles the plane. Where the SET sections do not tile the plane, a close approximation to a filled aperture may be achieved by making the array in the form of a stack or arrays—ie, three-dimensional—where at least one additional Surface of SETs is mounted behind at least one other such Surface, and the SETs in the or each rearward array radiate between the gaps in the frontward array(s).

The SETs are preferably similar, and ideally they are identical. They are, of course, sonic—that is, audio—devices, and most preferably they are able uniformly to cover the entire audio band from perhaps as low as (or lower than) 20 Hz, to as much as 20 KHz or more (the Audio Band). Alternatively, there can be used SETs of different sonic capabilities but together covering the entire range desired. Thus, multiple different SETs may be physically grouped together to form a composite SET (CSET) wherein the groups of different SETs together can cover the Audio Band even though the individual SETs cannot. As a further variant, SETs each capable of only partial Audio Band coverage can be not grouped but instead scattered throughout the array with enough variation amongst the SETs that the array as a whole has complete or more nearly complete coverage of the Audio Band.

An alternative form of CSET contains several (typically two) identical transducers, each driven by the same signal. This reduces the complexity of the required signal processing and drive electronics while retaining many of the advantages of a large DPAA. Where the position of a CSET is referred to hereinafter, it is to be understood that this position is the centroid of the CSET as a whole, i.e. the centre of gravity of all of the individual SETs making up the CSET.

Within a Surface the spacing of the SETs or CSET (hereinafter the two are denoted just by SETs)—that is, the general layout and structure of the array and the way the individual transducers are disposed therein—is preferably regular, and their distribution about the Surface is desirably symmetrical. Thus, the SETs are most preferably spaced in a triangular, square or hexagonal lattice. The type and orientation of the lattice can be chosen to control the spacing and direction of side-lobes.

Though not essential, each SET preferably has an omnidirectional input/output characteristic in at least a hemisphere at all sound wavelengths which it is capable of effectively radiating (or receiving).

Each output SET may take any convenient or desired form of sound radiating device (for example, a conventional loudspeaker), and though they are all preferably the same they could be different. The loudspeakers may be of the type known as pistonic acoustic radiators (wherein the transducer diaphragm is moved by a piston) and in such a case the maximum radial extent of the piston-radiators (eg, the effective piston diameter for circular SETs) of the individual SETs is preferably as small as possible, and ideally is as small as or smaller than the acoustic wavelength of the highest frequency in the Audio Band (eg in air, 20 KHz sound waves have a wavelength of approximately 17 mm, so for circular pistonic transducers, a maximum diameter of about 17 mm is preferable).

The overall dimensions of the or each array of SETs in the plane of the array are very preferably chosen to be as great as or greater than the acoustic wavelength in air of the lowest frequency at which it is intended to significantly affect the polar radiation pattern of the array. Thus, if it is desired to be able to beam or steer frequencies as low as 300 Hz, then the array size, in the direction at right angles to each plane in which steering or beaming is required, should be at least $c_s/300=1.1$ meter (where $c_s$ is the acoustic sound speed).

The invention is applicable to fully digital steerable sonic/audible acoustic phased array antenna system, and while the actual transducers can be driven by an analogue signal most preferably they are driven by a digital power amplifier. A typical such digital power amplifier incorporates: a PCM signal input; a clock input (or a means of deriving a clock from the input PCM signal); an output clock, which is either internally generated, or derived from the input clock or from an additional output clock input; and an optional output level input, which may be either a digital (PCM) signal or an analogue signal (in the latter case, this analogue signal may also provide the power for the amplifier output). A characteristic of a digital power amplifier is that, before any optional analogue output filtering, its output is discrete valued and stepwise continuous, and can only change level at intervals which match the output clock period. The discrete output values are controlled by the optional output level input, where provided. For PWM-based digital amplifiers, the output signal's average value over any integer multiple of the input sample period is representative of the input signal. For other digital amplifiers, the output signal's average value tends towards the input signal's average value over periods greater than the input sample period. Preferred forms of digital power amplifier include bipolar pulse width modulators, and one-bit binary modulators.

The use of a digital power amplifier avoids the more common requirement—found in most so-called "digital" systems—to provide a digital-to-analogue converter (DAC) and a linear power amplifier for each transducer drive channel, and therefore the power drive efficiency can be very high. Moreover, as most moving coil acoustic transducers are inherently inductive, and mechanically act quite effectively as low pass filters, it may be unnecessary to add elaborate electronic low-pass filtering between the digital drive circuitry and the SETs. In other words, the SETs can be directly driven with digital signals.

The DPAA has one or more digital input terminals (Inputs). When more than one input terminal is present, it is necessary to provide means for routing each input signal to the individual SETs.

This may be done by connecting each of the inputs to each of the SETs via one or more input signal Distributors. At the most basic, an input signal is fed to a single Distributor, and that single Distributor has a separate output to each of the SETs (and the signal it outputs is suitably modified, as discussed hereinafter, to achieve the end desired). Alternatively, there may be a number of similar Distributors, each taking the, or part of the, input signal, or separate input signals, and then each providing a separate output to each of the SETs (and in each case the signal it outputs is suitably modified, with the Distributor, as discussed hereinafter, to achieve the end desired). In this latter case—a plurality of Distributors each feeding all the SETs—the outputs from each Distributor to any one SET have to be combined, and conveniently this is done by an adder circuit prior to any further modification the resultant feed may undergo.

The Input terminals preferably receive one or more digital signals representative of the sound or sounds to be handled by the DPAA (Input Signals). Of course, the original electrical signal defining the sound to be radiated may be in an analogue form, and therefore the system of the invention may include one or more analogue-to-digital converters (ADCs) connected each between an auxiliary analogue input terminal (Analogue Input) and one of the Inputs, thus allowing the conversion of these external analogue electrical signals to internal digital electrical signals, each with a specific (and appropriate) sample rate $Fs_i$. And thus, within the DPAA, beyond the Inputs, the signals handled are time-sampled quantized digital signals representative of the sound waveform or waveforms to be reproduced by the DPAA.

A digital sample-rate-converter (DSRC) is required to be provided between an Input and the remaining internal electronic processing system of the DPAA if the signal presented at that input is not synchronised with the other components of and input signals to, the DPAA. The output of each DSRC is clocked in-phase with and at the same rate as all the other DSRCs, so that disparate external signals from the Inputs with different clock rates and/or phases can be brought together within the DPAA, synchronised, and combined meaningfully into one or more composite internal data channels. The DSRC may be omitted on one "master" channel if that input signal's clock is then used as the master clock for all the other DSRC outputs. Where several external input signals already share a common external or internal data timing clock then there may effectively be several such "master" channels.

No DSRC is required on any analogue input channel as its analogue to digital conversion process may be controlled by the internal master clock for direct synchronisation.

The DPAA of the invention incorporates a Distributor which modifies the input signal prior to feeding it to each SET in order to achieve the desired directional effect. A Distributor is a digital device, or piece of software, with one input and multiple outputs. One of the DPAA's Input Signals is fed into its input. It preferably has one output for each SET; alternatively, one output can be shared amongst a number of the SETs or the elements of a CSET. The Distributor sends generally differently modified versions of the input signal to each of its outputs. The modifications can be either fixed, or adjustable using a control system. The modifications carried out by the distributor can comprise applying a signal delay, applying amplitude control and/or adjustably digitally filtering. These modifications may be carried out by signal delay means (SDM), amplitude control means (ACM) and adjustable digital filters (ADFs) which are respectively located within the Distributor. It is to be noted that the ADFs can be arranged to apply delays to the signal by appropriate choice of filter coefficients. Further, this delay can be made frequency dependent such that different frequencies of the input signal are delayed by different amounts and the filter can produce the effect of the sum of any number of such delayed versions of the signal. The terms “delaying” or “delayed” used herein should be construed as incorporating the type of delays applied by ADFs as well as SDMs. The delays can be of any useful duration including zero, but in general, at least one replicated input signal is delayed by a non-zero value.

The signal delay means (SDM) are variable digital signal time-delay elements. Here, because these are not single-frequency, or narrow frequency-band, phase shifting elements but true time-delays, the DPAA will operate over a broad frequency band (eg the Audio Band). There may be means to adjust the delays between a given input terminal and each SET, and advantageously there is a separately adjustable delay means for each Input/SET combination.

The minimum delay possible for a given digital signal is preferably as small or smaller than $T_s$, that signal’s sample period; the maximum delay possible for a given digital signal should preferably be chosen to be as large as or larger than $T_c$, the time taken for sound to cross the transducer array across its greatest lateral extent, $D_{max}$, where $T_c=D_{max}/c_s$ where $c_s$ is the speed of sound in air. Most preferably, the smallest incremental change in delay possible for a given digital signal should be no larger than $T_s$, that signal’s sample period. Otherwise, interpolation of the signal is necessary.

The amplitude control means (ACM) is conveniently implemented as digital amplitude control means for the purposes of gross beam shape modification. It may comprise an amplifier or alternator so as to increase or decrease the magnitude of an output signal. Like the SDM, there is preferably an adjustable ACM for each Input/SET combination. The amplitude control means is preferably arranged to apply differing amplitude control to each signal output from the Distributor so as to counteract for the fact that the DPAA is of finite size. This is conveniently achieved by normalising the magnitude of each output signal in accordance with a predefined curve such as a Gaussian curve or a raised cosine curve. Thus, in general, output signals destined for SETs near the centre of the array will not be significantly affected but those near to the perimeter of the array will be attenuated according to how near to the edge of the array they are.

Another way of modifying the signal uses digital filters (ADF) whose group delay and magnitude response vary in a specified way as a function of frequency (rather than just a simple time delay or level change)—simple delay elements may be used in implementing these filters to reduce the necessary computation. This approach allows control of the DPAA radiation pattern as a function of frequency which allows control of the radiation pattern of the DPAA to be adjusted separately in different frequency bands (which is useful because the size in wavelengths of the DPAA radiating area, and thus its directionality, is otherwise a strong function of frequency). For example, for a DPAA of say 2 m extent its low frequency cut-off (for directionality) is around the 150 Hz region, and as the human ear has difficulty in determining directionality of sounds at such a low frequency it may be more useful not to apply “beam-steering” delays and amplitude weighting at such low frequencies but instead to go for an optimized output level. Additionally, the use of filters may also allow some compensation for unevenness in the radiation pattern of each SET.

The SDM delays, ACM gains and ADF coefficients can be fixed, varied in response to User input, or under automatic control. Preferably, any changes required while a channel is in use are made in many small increments so that no discontinuity is heard. These increments can be chosen to define predetermined “roll-off” and “attack” rates which describe how quickly the parameters are able to change.

If different SETs in the array have different inherent sensitivities then it may be preferred to calibrate out such differences using an analogue method associated directly with the SETs themselves and/or their power driving circuitry, in order to minimise any loss in resolution that might result from utilising digital calibration further back in the signal processing path. This refinement is particularly useful where low-bit-number high-over-sample-rate digital coding is used prior to the points in the system where multiple input-channel-signals are brought together (added) in combination for application to individual SETs.

Where more than one Input is provided—ie there are I inputs numbered 1 to I and where there are N SETs, numbered 1 to N, it is preferable to provide a separate and separately-adjustable delay, amplitude control and/or filter means $D_m$, (where I=1 to I, n=1 to N, between each of the I inputs and each of the N SETs) for each combination. For each SET there are thus 1 delayed or filtered digital signals, one from each of the Inputs via the separate Distributor, to be combined before application to the SET. There are in general N separate SDMs, ACMs and/or ADFs in each Distributor, one for each SET. As noted above, this combination of digital signals is conveniently done by digital algebraic addition of the I separate delayed signals—ie the signal to each SET is a linear combination of separately modified signals from each of the I Inputs. It is because of this requirement to perform digital addition of signals originating from more than one Input that the DSRCs (see above) are desirable, to synchronize these external signals, as it is generally not meaningful to perform digital addition on two or more digital signals with different clock rates and/or phases.

The input digital signals are preferably passed through an oversampling-noise-shaping-quantizer (ONSQ) which reduces their bit-width and increases their sample-rate whilst keeping their signal to noise ratio (SNR) in the acoustic band largely unchanged. The principle reason for doing this is to allow the digital transducer drive-circuitry (“digital amplifiers”) to operate with feasible clock rates. For example, if the drives are implemented as digital PWM, then if the signal bit-width to the PWM circuit is b bits, and its sample rate s samples per second, then the PWM clock-rate p needs to be $p=2^b s$ Hz—eg for b=16, and s=44 KHz, then p=2.88 GHz, which is quite impractical at the present level of technology. If, however, the input signal were to be oversampled 4 times and the bit width reduced to 8 bits, then $p=2^8\times4\times44$ KHz=45 MHz, which is easily achievable with standard logic or FPGA circuitry. In general, use of an ONSQ increases the signal bit rate. In the example given the original bit rate $R_0=16\times44000=704$ Kbits/sec, whilst the oversampled bit rate is $Rq=8\times44000\times4=1.408$ Mbits/sec, (which is twice as high). If the ONSQ is connected between an Input and the inputs to the digital delay generators (DDG), then the DDG will in general require more storage capacity to accommodate the higher bit rate; if, however, the DDGs operate at the Input bit-width and sample rate (thus requiring the minimum storage capacity in the DDGs), and instead an ONSQ is connected between each DDG output and SET digital driver, then one ONSQ is required for every SET, which increases the complexity of the DPAA, where the number of SETs is large. There are two additional trade-offs in the latter case:

1. the DDG circuitry can operate at a lower clock rate, subject to the requirement for sufficiently fine control of the signal delays; and
2. with an array of separate ONSQs the quantization-noise from each can be designed to be uncorrelated with the noise from all the rest, so that at the output of the DPAA the quantization-noise components will add in an uncorrelated fashion and so each doubling of the number of SETs will lead to an increase of only 3 dB instead of 6 dB to the total quantization-noise power;

and these considerations may make post-DDG ONSQs (or two stages of OSNQ—one pre-DDG and one post-DDG) the more attractive implementation strategy.

The input digital signal(s) are advantageously passed through one or more digital pre-compensators to correct for the linear and/or non-linear response characteristics of the SETs. In the case of a DPAA with multiple Inputs/Distributors, it is essential that, if non-linear compensation is to be carried out, it be performed on the digital signals after the separate channels have been combined in the digital adders which occur after the DDGs too; this results in the requirement for a separate non-linear compensator (NLC) for each and every SET. However, in the case of linear-compensation, or where there is only one Input/Distributor, the compensator(s) can be placed directly in the digital signal stream after the Input(s), and at most one compensator per Input is required. Such linear compensators are usefully implemented as filters which correct the SETs for amplitude and phase response across a wide frequency range; such non-linear compensators correct for the imperfect (non-linear) behaviour of the SET motor and suspension components which are generally highly non-linear where considerable excursion of the SET moving-component is required.

The DPAA system may be used with a remote-control handset (Handset) that communicates with the DPAA electronics (via wires, or radio or infra-red or some other wireless technology) over a distance (ideally from anywhere in the listening area of the DPAA), and provides manual control over all the major functions of the DPAA. Such a control system would be most useful to provide the following functions:

1) selection of which Input(s) are to be connected to which Distributor, which might also be termed a "Channel";
2) control of the focus position and/or beam shape of each Channel;
3) control of the individual volume-level settings for each Channel; and
4) an initial parameter set-up using the Handset having a built-in microphone (see later).

There may also be:

means to interconnect two or more such DPAAs in order to coordinate their radiation patterns, their focussing and their optimization procedures;

means to store and recall sets of delays (for the DDGs) and filter coefficients (for the ADFs);

The invention will be further described, by way of non-limitative example only, with reference to the accompanying schematic drawings, in which:—

Figure 5:
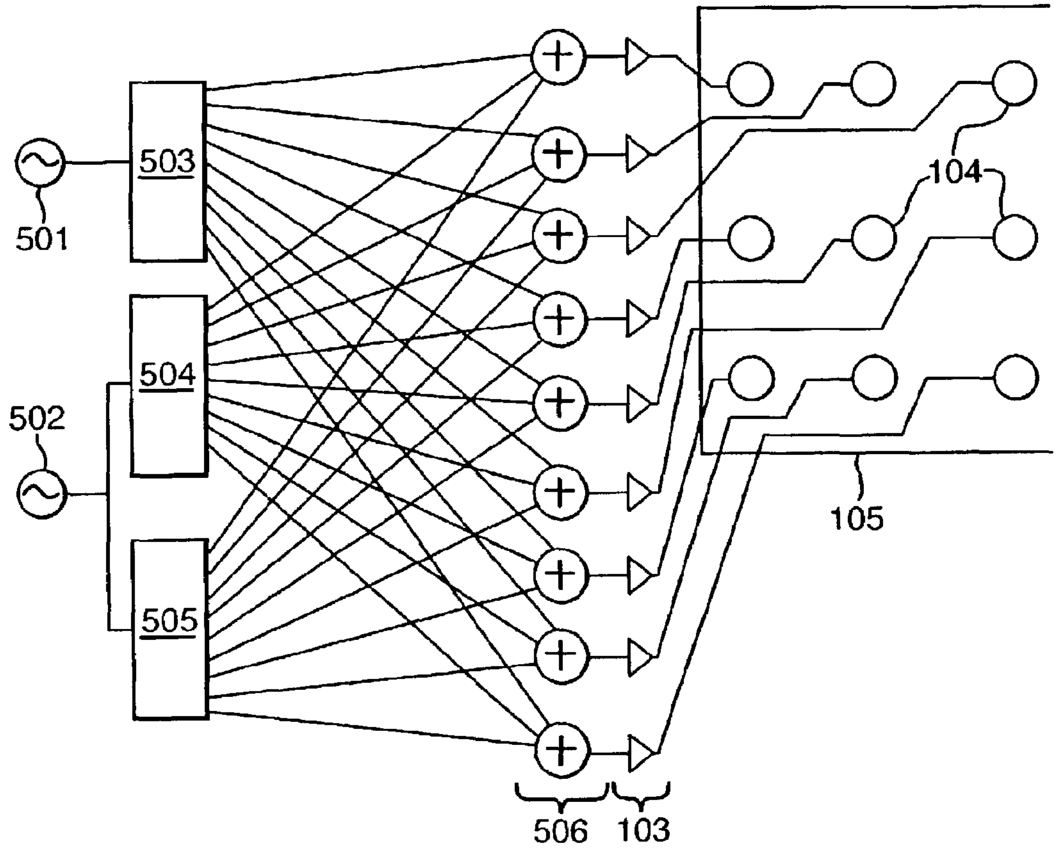
FIG. 5 is a block diagram of a multiple-input apparatus.
Figure 29:
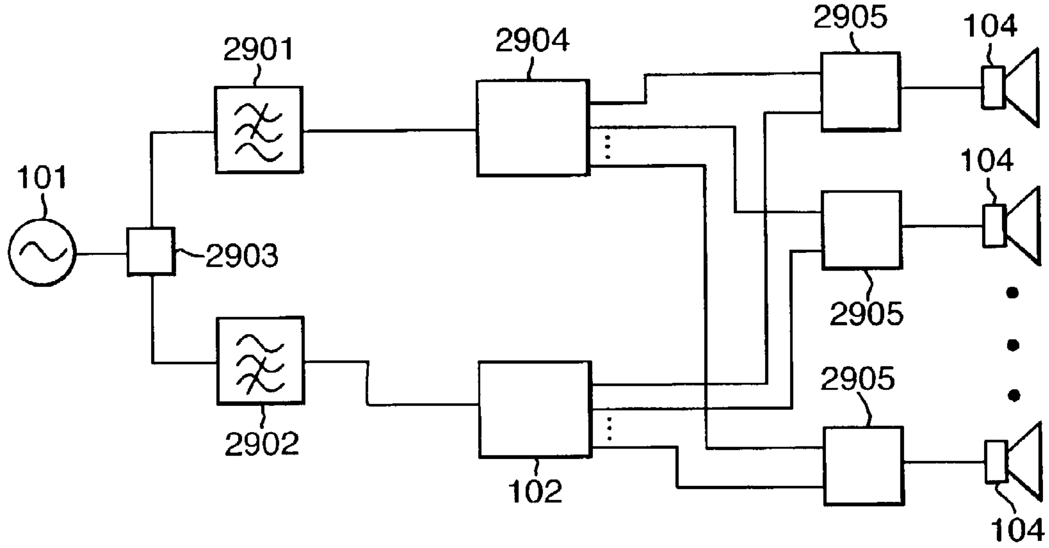
Figure 30:
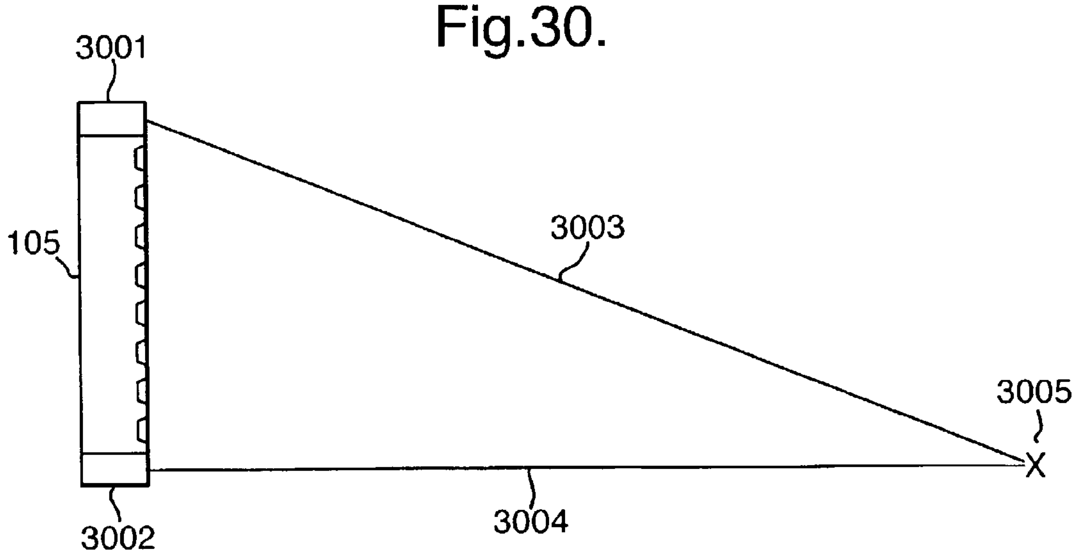
Figure 31:
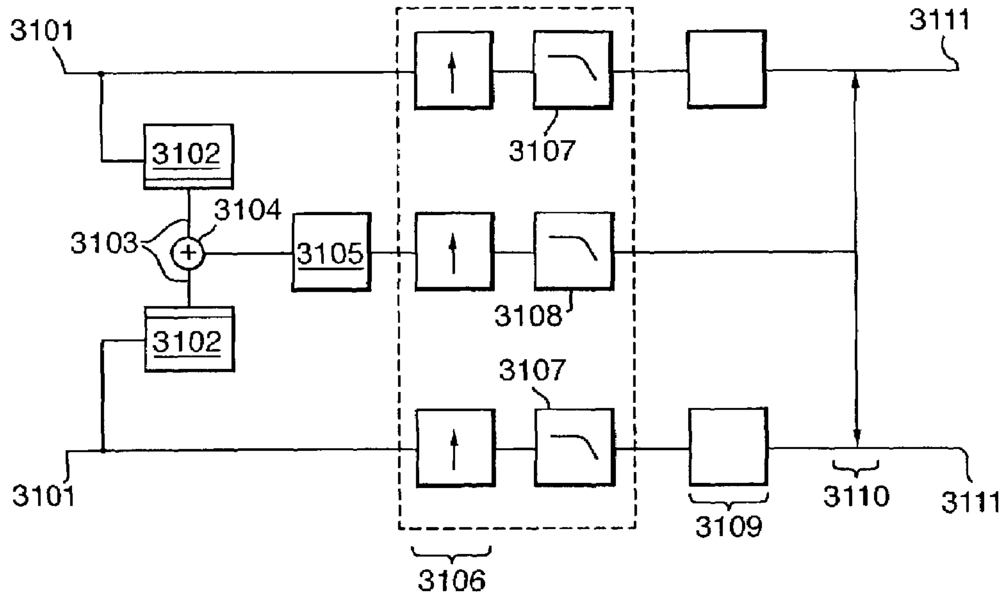
Figure 32:
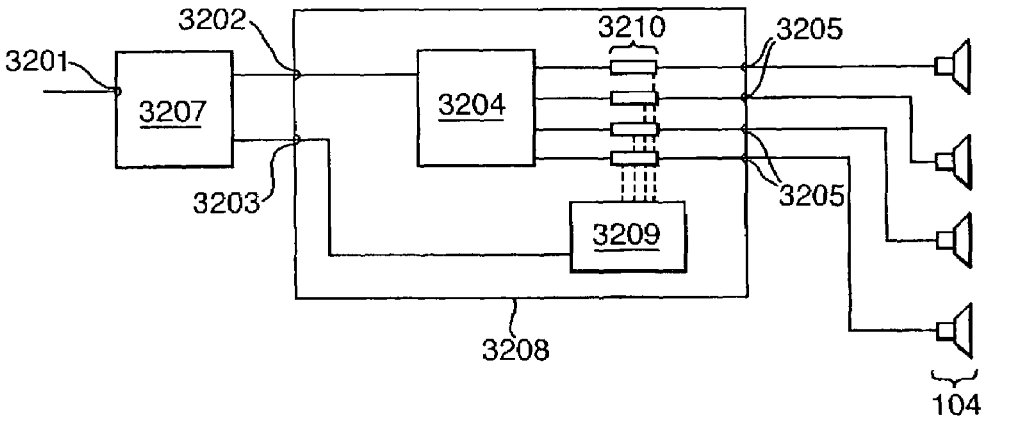

FIGS. 25A to F are time-line diagrams explaining how signals originating from O are given less weight;

FIGS. 26A to F are time-line diagrams explaining how signals originating at X are negligibly affected by the input nulling;

FIG. 27 is a block diagram showing how test signal generation and analysis can be incorporated into apparatus similar to that shown in FIG. 5;

FIG. 28 is a block diagram showing two ways of inserting test signals into an output signal;

FIG. 29 is a block diagram showing apparatus capable of shaping different frequencies in different ways;

FIG. 30 is a plan view of apparatus which allows the visualisation of focus points;

FIG. 31 is a block diagram of apparatus to limit two input signals to avoid clipping or distortion; and FIG. 32 is a block diagram of a reproducing apparatus capable of extracting sound field shaping information associated with an audio signal.

The description and Figures provided hereinafter necessarily describe the invention using block diagrams, with each block representing a hardware component or a signal processing step. The invention could, in principle, be realised by building separate physical components to perform each step, and interconnecting them as shown. Several of the steps could be implemented using dedicated or programmable integrated circuits, possibly combining several steps in one circuit. It will be understood that in practice it is likely to be most convenient to perform several of the signal processing steps in software, using Digital Signal Processors (DSPs) or general purpose microprocessors. Sequences of steps could then be performed by separate processors or by separate software routines sharing a microprocessor, or be combined into a single routine to improve efficiency.

The Figures generally only show audio signal paths; clock and control connections are omitted for clarity unless necessary to convey the idea. Moreover, only small numbers of SETs, Channels, and their associated circuitry are shown, as diagrams become cluttered and hard to interpret if the realistically large numbers of elements are included.

Before the respective aspects of the present invention are described, it is useful to describe embodiments of the apparatus which are suitable for use in accordance with any of the respective aspects.

Figure 1:
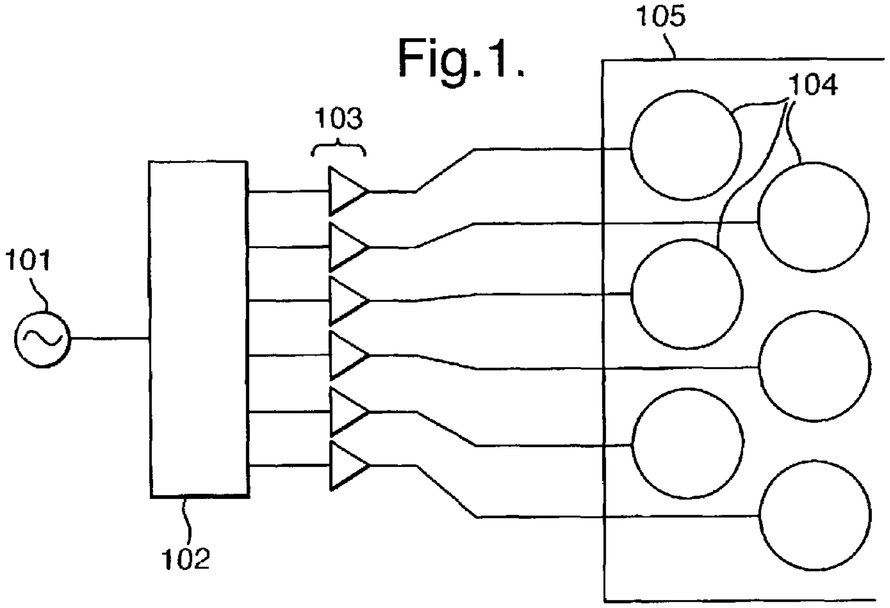
FIG. 1 shows a representation of a simple single-input apparatus.
Figure 10:
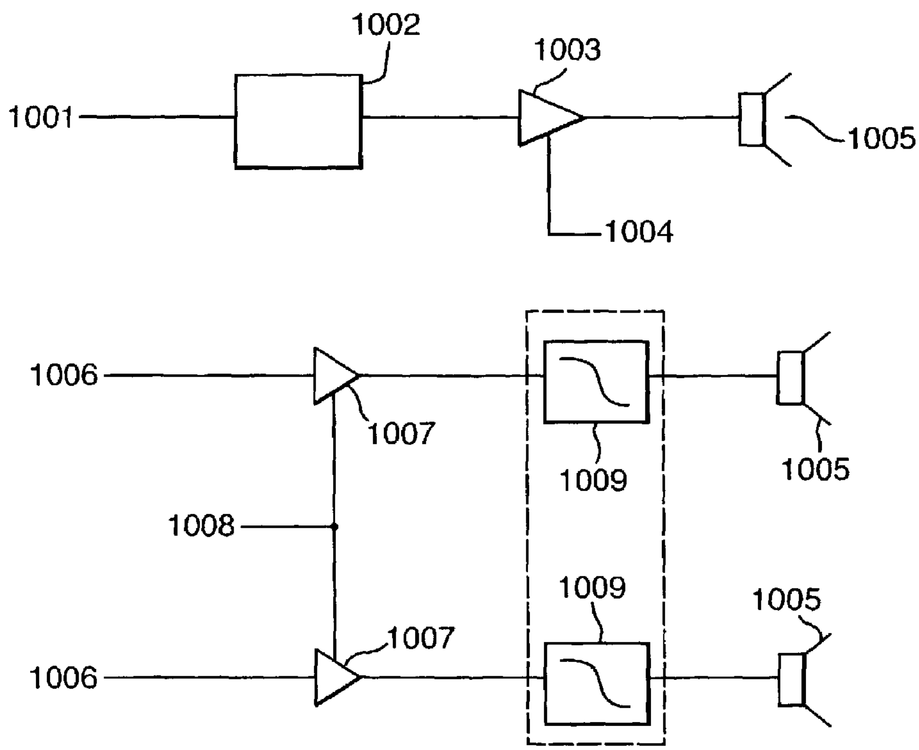
FIG. 10 is a block diagram of a linear amplifier and a digital amplifier used in preferred embodiments of the present invention.

The block diagram of FIG. 1 depicts a simple DPAA. An input signal (101) feeds a Distributor (102) whose many (6 in the drawing) outputs each connect through optional amplifiers (103) to output SETs (104) which are physically arranged to form a two-dimensional array (105). The Distributor modifies the signal sent to each SET to produce the desired radiation pattern. There may be additional processing steps before and after the Distributor, which are illustrated in turn later. Details of the amplifier section are shown in FIG. 10.

Figure 2A:
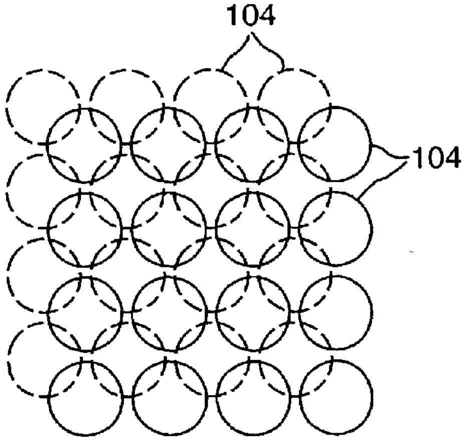
FIGS. 2A and 2B show front and perspective views of a multiple surface array of transducers.
Figure 2B:
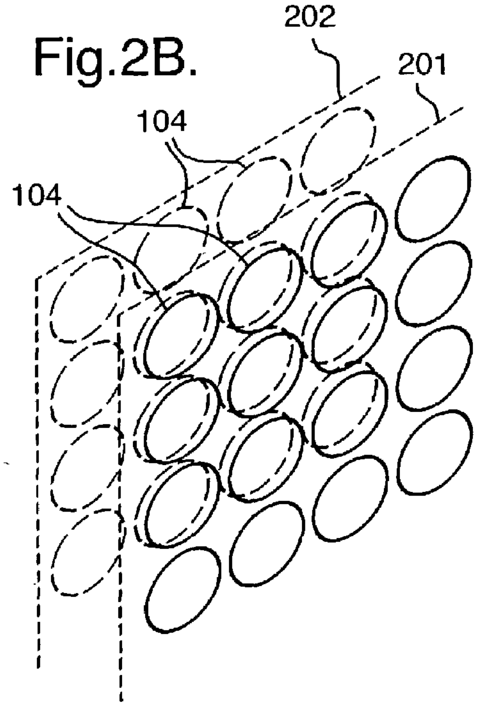

FIG. 2 shows SETs (104) arranged to form a front Surface (201) and a second Surface (202) such that the SETs on the rear Surface radiate through the gaps between SETs in the front Surface.

Figure 3A:
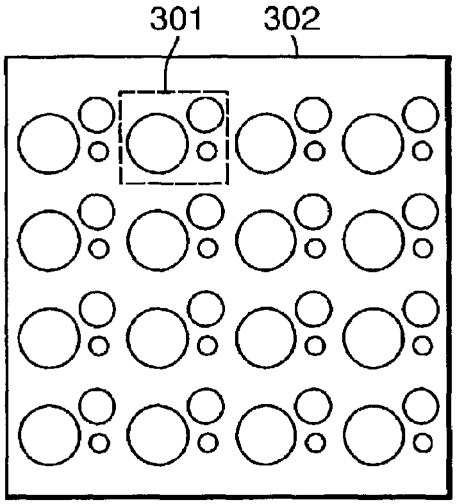
FIGS. 3A and 3B show a front views of a possible CSET configuration and a front view of an array comprised of multiple types of SET.
Figure 3B:
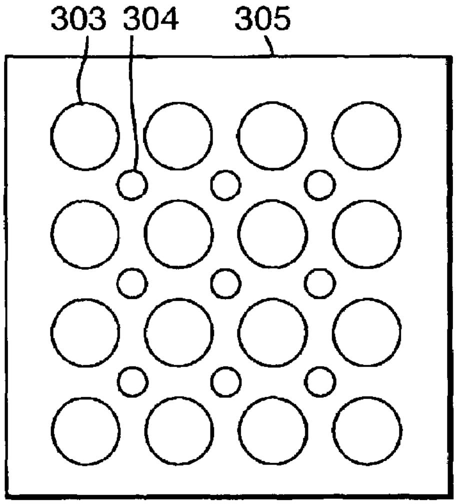

FIG. 3 shows CSETs (301) arranged to make an array (302), and two different types of SET (303, 304) combined to make an array (305). In the case of FIG. 3*a*, the “position” of the CSET may be thought to be at the centre of gravity of the group of SETS.

Figure 4A:
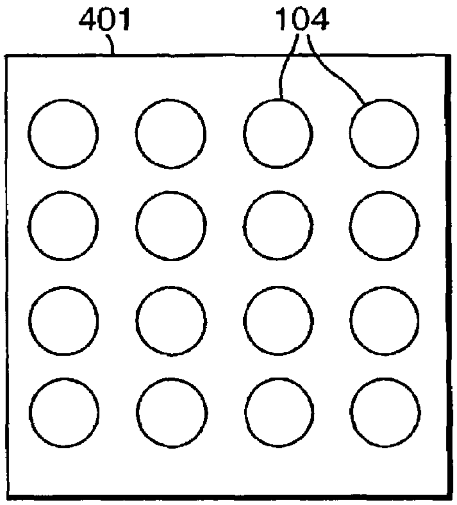
FIGS. 4A and 4B show front views of rectangular and hexagonal arrays of SETs.
Figure 4B:
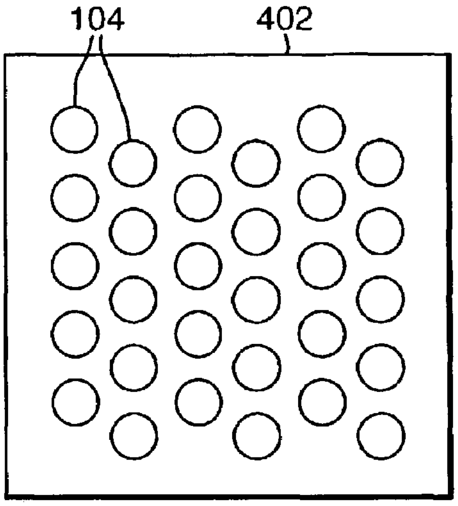

FIG. 4 shows two possible arrangements of SETs (104) forming a rectangular array (401) and a hex array (402).

FIG. 5 shows a DPAA with two input signals (501,502) and three Distributors (503-505). Distributor 503 treats the signal 501, whereas both 504 and 505 treat the input signal 502. The outputs from each Distributor for each SET are summed by adders (506), and pass through amplifiers 103 to the SETs 104. Details of the input section are shown in FIGS. 6 and 7.

Figure 6:
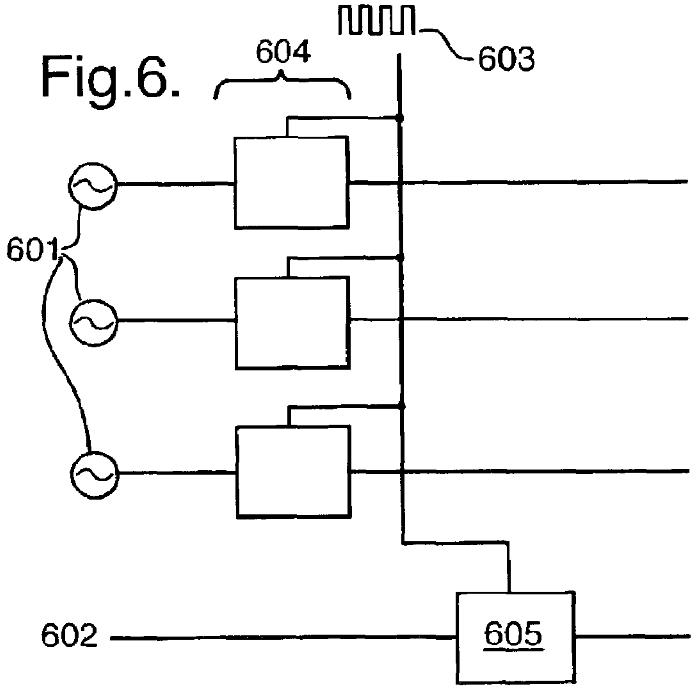
FIG. 6 is a block diagram of an input stage having its own master clock.

FIG. 6 shows a possible arrangement of input circuitry with, for illustrative purposes, three digital inputs (601) and one analogue input (602). Digital receiver and analogue buffering circuitry has been omitted for clarity. There is an internal master clock source (603), which is applied to DSRCs (604) on each of the digital inputs and the ADC (605) on the analogue input. Most current digital audio transmission formats (e.g. S/PDIF, AES/EBU), DSRCs and ADCs treat (stereo) pairs of channels together. It may therefore be most convenient to handle Input Channels in pairs.

Figure 7:
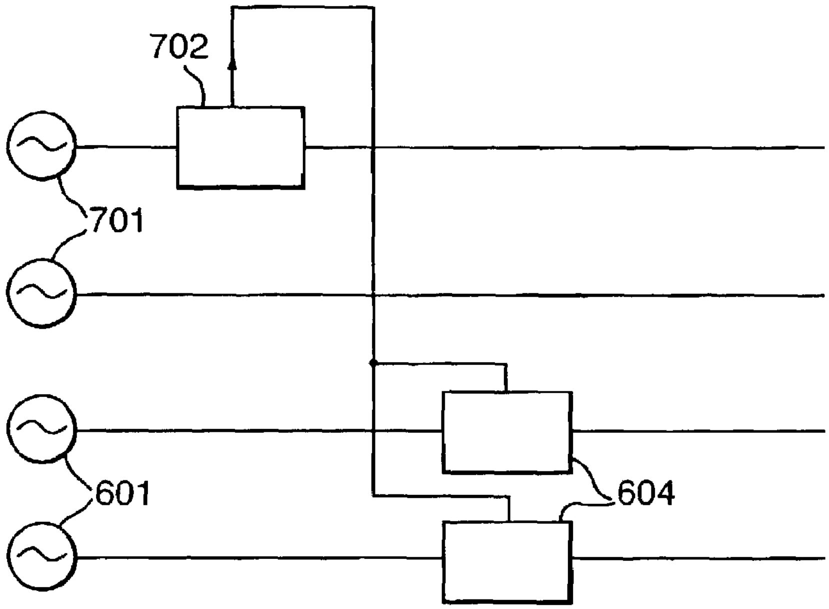
FIG. 7 is a block diagram of an input stage which recovers an external clock.

FIG. 7 shows an arrangement in which there are two digital inputs (701) which are known to be synchronous and from which the master clock is derived using a PLL or other clock recovery means (702). This situation would arise, for example, where several channels are supplied from an external surround sound decoder. This clock is then applied to the DSRCs (604) on the remaining inputs (601).

Figure 8:
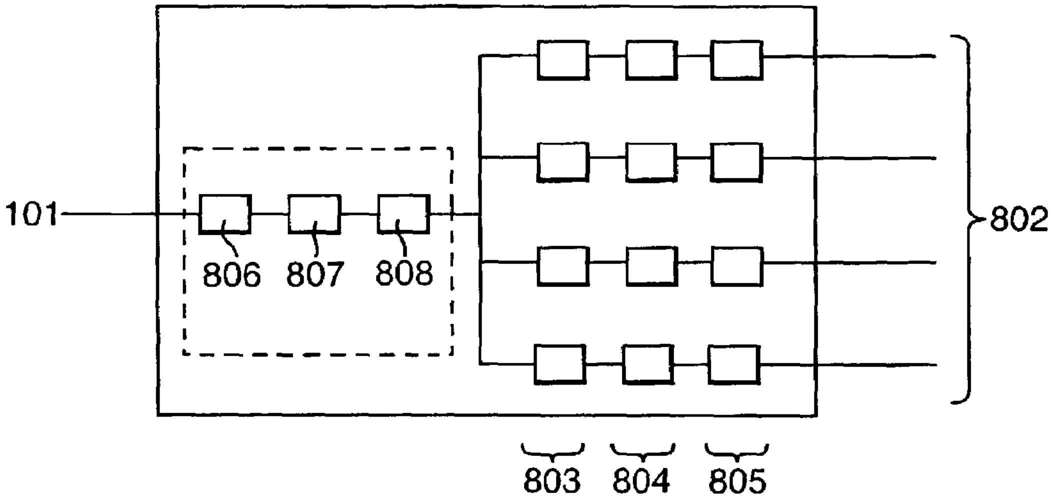
FIG. 8 is a block diagram of a general purpose Distributor.

FIG. 8 shows the components of a Distributor. It has a single input signal (101) coming from the input circuitry and multiple outputs (802), one for each SET or group of SETs. The path from the input to each of the outputs contains a SDM (803) and/or an ADF (804) and/or an ACM (805). If the modifications made in each signal path are similar, the Distributor can be implemented more efficiently by including global SDM, ADF and/or ACM stages (806-808) before splitting the signal. The parameters of each of the parts of each Distributor can be varied under User or automatic control. The control connections required for this are not shown.

Figure 9:
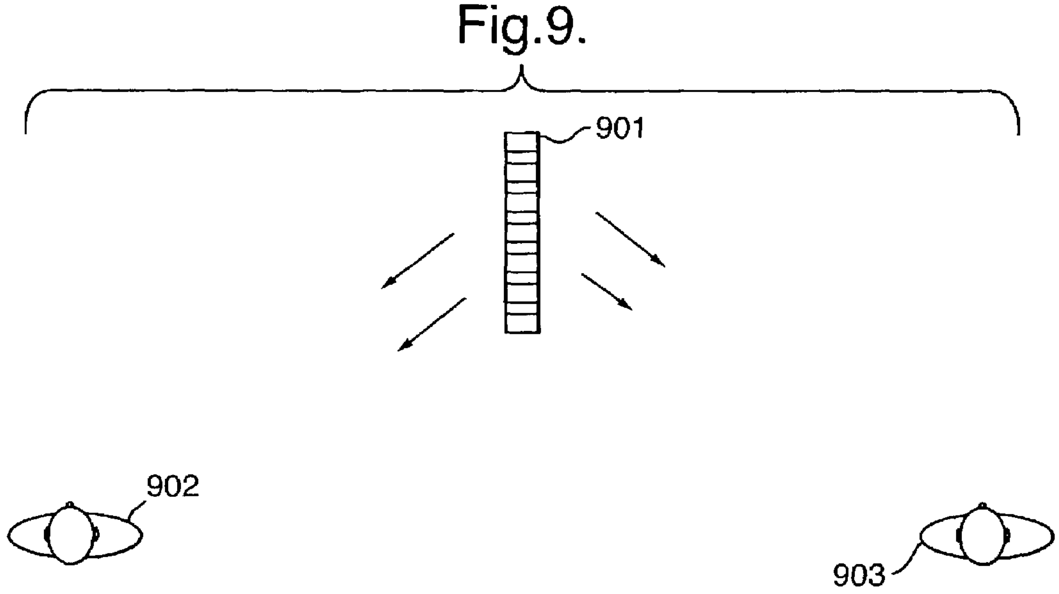
FIG. 9 shows an open backed array of output transducers operated to direct sound to listeners in a symmetrical fashion.

In certain circumstances, especially in concert hall and arena settings, it is also possible to make use of the fact that the DPAA is front-back symmetrical in its radiation pattern, when beams with real focal points are formed, in the case where the array of transducers is made with an open back (ie. no sound-opaque cabinet placed around the rear of the transducers). For example, in the instance described above where sound reflecting or scattering surfaces are placed near such real foci at the “front” of the DPAA, additional such reflecting or scattering surfaces may advantageously be positioned at the mirror image real focal points behind the DPAA to further direct the sound in the desired manner. In particular, if a DPAA is positioned with its side facing the target audience area, and an off-axis beam from the front of the array is steered to a particular section of the audience, say at the left of the auditorium, then its mirror-image focussed beam (in antiphase) from the rear of the DPAA will be directed to a well-separated section of the same audience at the right of the auditorium. In this manner useful acoustic power may be derived from both the front and rear radiation fields of the transducers. FIG. 9 illustrates the use of an open-backed DPAA (901) to convey a signal to left and right sections of an audience (902,903), exploiting the rear radiation. The different parts of the audience receive signals with opposite polarity. This system may be used to detect a microphone position (see later) in which case any ambiguity can be resolved by examining the polarity of the signal received by the microphone.

FIG. 10 shows possible power amplifier configurations. In one option, the input digital signal (1001), possibly from a Distributor or adder, passes through a DAC (1002) and a linear power amplifier (1003) with an optional gain/volume control input (1004). The output feeds a SET or group of SETs (1005). In a preferred configuration, this time illustrated for two SET feeds, the inputs (1006) directly feed digital amplifiers (1007) with optional global volume control input (1008). The global volume control inputs can conveniently also serve as the power supply to the output drive circuitry. The discrete-valued digital amplifier outputs optionally pass through analogue low-pass filters (1009) before reaching the SETs (1005).

Figure 11:
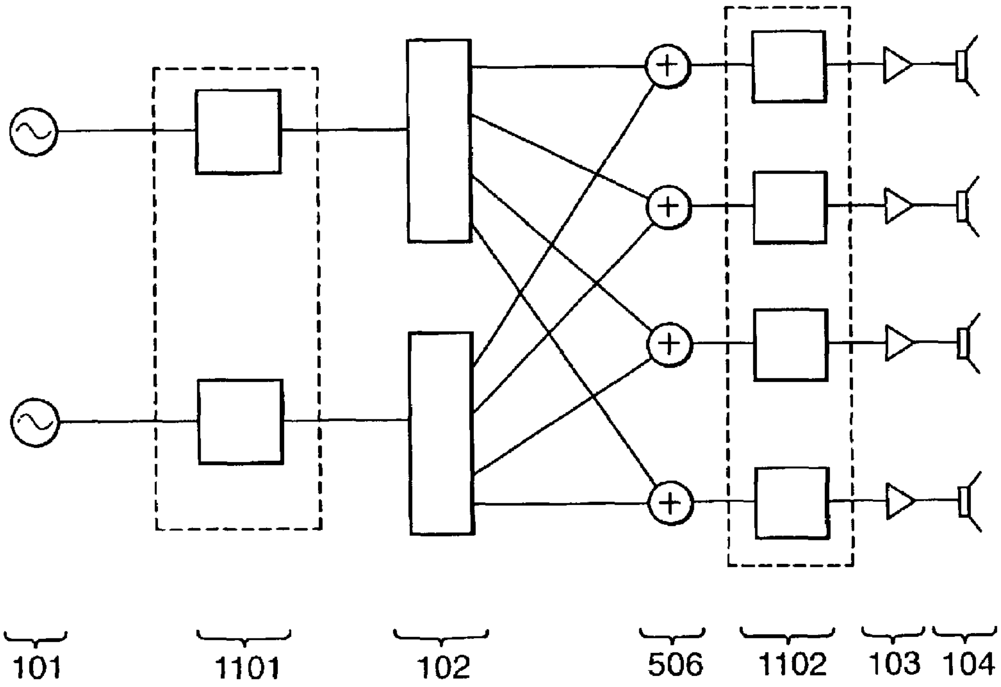
FIG. 11 is a block diagram showing the points at which ONSQ stages can be incorporated into apparatus similar to that shown in FIG. 5.

FIG. 11 shows that ONSQ stages can be incorporated in to the DPAA either before the Distributors, as (1101), or after the adders, as (1102), or in both positions. Like the other block diagrams, this shows only one elaboration of the DPAA architecture. If several elaborations are to be used at once, the extra processing steps can be inserted in any order.

Figure 12:
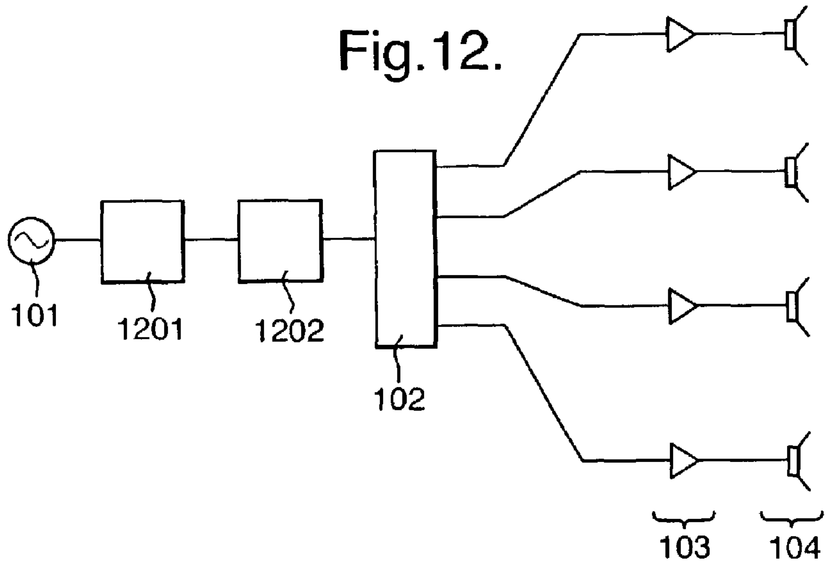
FIG. 12 is a block diagram showing where linear and non-linear compensation may be incorporated into an apparatus similar to that shown in FIG. 1.

FIG. 12 shows the incorporation of linear compensation (1201) and/or non-linear compensation (1202) into a single-Distributor DPAA. Non-linear compensation can only be used in this position if the Distributor applies only pure delay, not filtering or amplitude changes.

Figure 13:
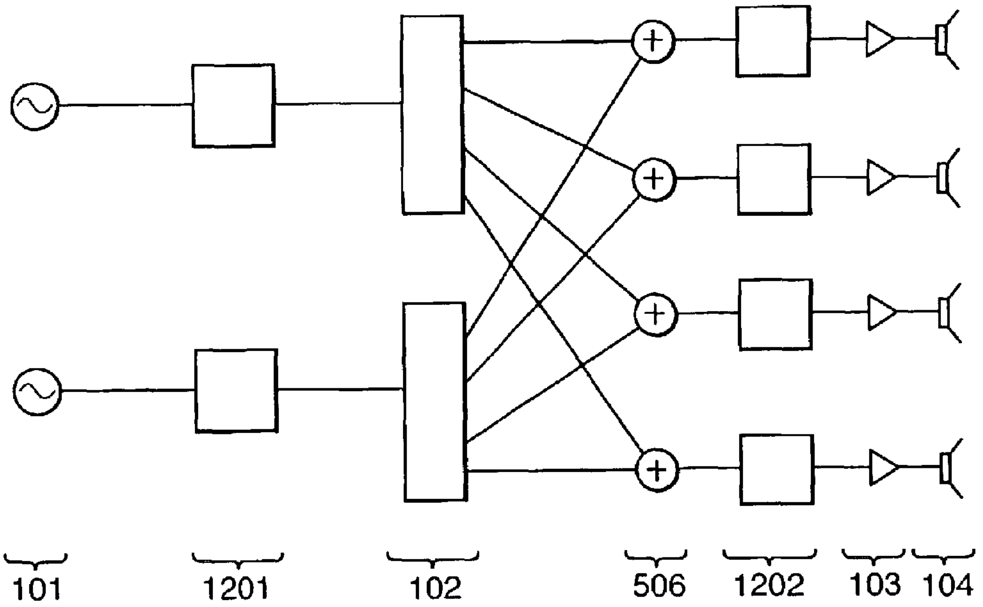
FIG. 13 is a block diagram showing where linear and non-linear compensation can be incorporated into a multiple input apparatus.

FIG. 13 shows the arrangement for linear and/or non-linear compensation in a multi-Distributor DPAA. The linear compensation 1301 can again be applied at the input stage before the Distributors, but now each output must be separately non-linearly compensated 1302. This arrangement also allows non-linear compensation where the Distributor filters or changes the amplitude of the signal. The use of compensators allows relatively cheap transducers to be used with good results because any shortcomings can be taken into account by the digital compensation. If compensation is carried out before replication, this has the additional advantage that only one compensator per input signal is required.

Figure 14:
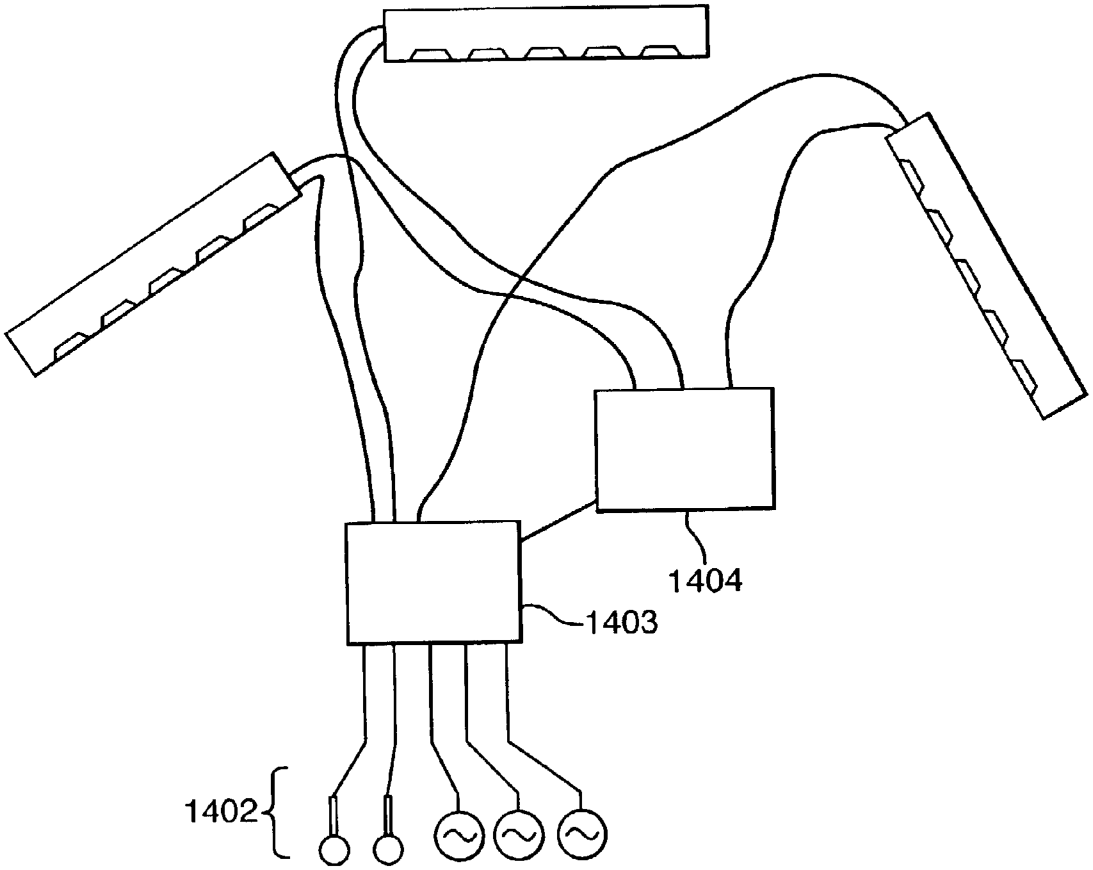
FIG. 14 shows the interconnection of several arrays with common control and input stages.

FIG. 14 illustrates the interconnection of three DPAAs (1401). In this case, the inputs (1402), input circuitry (1403) and control systems (1404) are shared by all three DPAAs. The input circuitry and control system could either be separately housed or incorporated into one of the DPAAs, with the others acting as slaves. Alternatively, the three DPAAs could be identical, with the redundant circuitry in the slave DPAAs merely inactive. This set-up allows increased power, and if the arrays are placed side by side, better directivity at low frequencies.

First Aspect of the Invention

Figure 15:
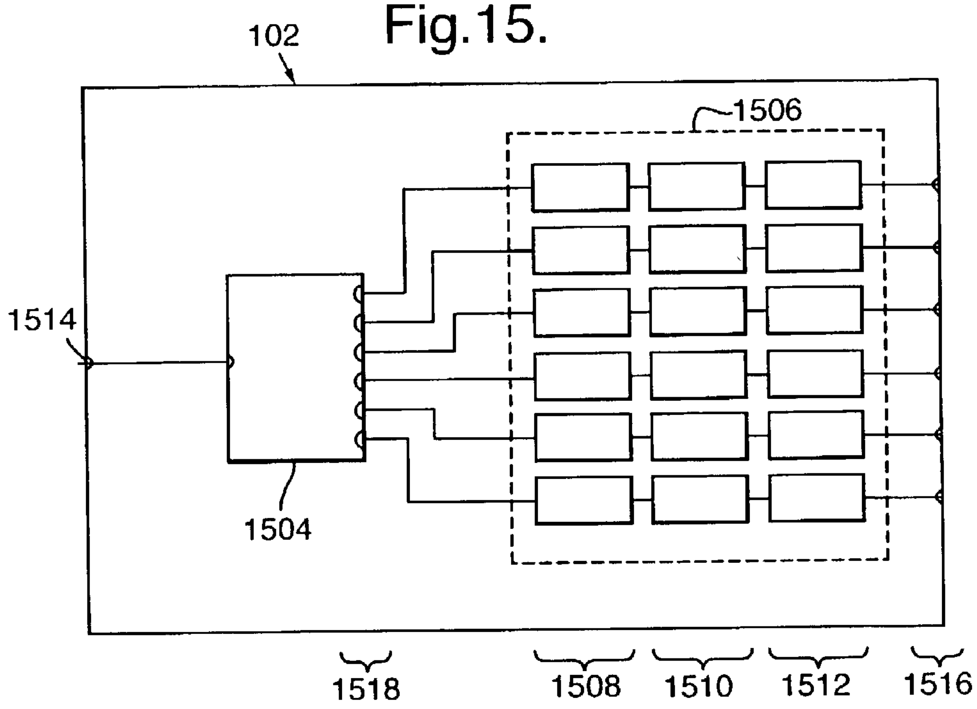
FIG. 15 shows a Distributor in accordance with the first aspect of the present invention.

The first aspect of the Invention will now be generally described with reference to FIG. 15 and FIGS. 16A-D. The apparatus of the first aspect has the general structure shown in FIG. 1. FIG. 15 shows the Distributor (102) of this embodiment in further detail.

As can be seen from FIG. 5, the input signal (101) is routed to a replicator (1504) by means of an input terminal (1514). The replicator (1504) has the function of copying the input signal a pre-determined number of times and providing the same signal at said pre-determined number of output terminals (1518). Each replica of the input signal is then supplied to the means (1506) for modifying the replicas. In general, the means (1506) for modifying the replicas includes signal delay means (1508), amplitude control means (1510) and adjustable digital filter means (1512). However, it should be noted that the amplitude control means (1510) is purely optional. Further, one or other of the signal delay means (1508) and adjustable digital filter (1512) may also be dispensed with. The most fundamental function of the means (1506) to modify replicas is to provide that different replicas are in some sense delayed by generally different amounts. It is the choice of delays which determines the sound field achieved when the output transducers (104) output the various delayed versions of the input signal (101). The delayed and preferably otherwise modified replicas are output from the Distributor (102) via output terminals (1516).

As already mentioned, the choice of respective delays carried by each signal delay means (1508) and/or each adjustable digital filter (1512) critically influences the type of sound field which is achieved. The first aspect of the invention relates to four particularly advantageous sound fields and linear combinations thereof.

First Embodiment

Figure 16A:
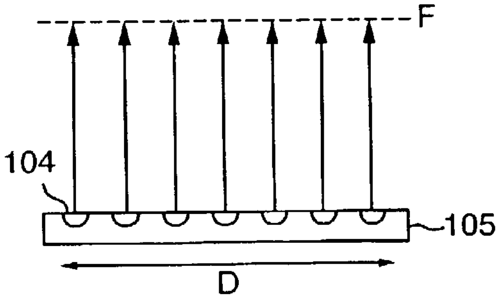
FIGS. 16A to 16D show four types of sound field which may be achieved using the apparatus of the first aspect of the present invention.
Figure 16B:
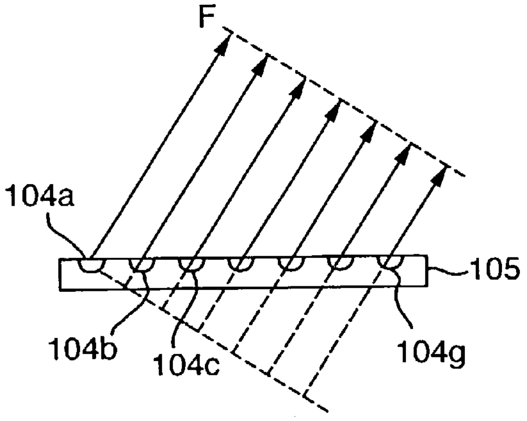

A sound field according to the first embodiment of the first aspect of the invention is shown in FIG. 16A.

The array (105) comprising the various output transducers (104) is shown in plan view. Other rows of output transducers may be located above or below the illustrated row as shown, for example, in FIG. 4A or 4B.

In this embodiment, the delays applied to each replica by the various signal delay means (508) are set to be the same value, eg 0 (in the case of a plane array as illustrated), or to values that are a function of the shape of the Surface (in the case of curved surfaces). This produces a roughly parallel "beam" of sound representative of the input signal (101), which has a wave front F parallel to the array (105). The radiation in the direction of the beam (perpendicular to the wave front) is significantly more intense than in other directions, though in general there will be "side lobes" too. The assumption is that the array (105) has a physical extent which is one or several wavelengths at the sound frequencies of interest. This fact means that the side lobes can generally be attenuated or moved if necessary by adjustment of the ACMs or ADFs.

The mode of operation in this first embodiment may generally be thought of as one in which the array (105) mimics a very large traditional loudspeaker. All of the individual transducers (104) of the array (105) are operated in phase to produce a symmetrical beam with a principle direction perpendicular to the plane of the array. The sound field obtained will be very similar to that which would be obtained if a single large loudspeaker having a diameter D was used.

Second Embodiment

The first embodiment might be thought of as a specific example of the more general second embodiment.

In this embodiment, the delay applied to each replica by the signal delay means (1508) or adjustable digital filter (1512) is made to vary such that the delay increases systematically amongst the transducers (104) in some chosen direction across the surface of the array. This is illustrated in FIG. 15B. The delays applied to the various signals before they are routed to their respective output transducer (104) may be visualised in FIG. 15B by the dotted lines extending behind the transducer. A longer dotted line represents a longer delay time. In general, the relationship between the dotted lines and the actual delay time will be $d_n=t_n*c$ where d represents the length of the dotted line, t represents the amount of delay applied to the respective signal and c represents the speed of sound in air.

As can be seen from FIG. 15B, the delays applied to the output transducers increase linearly as you move from left to right in FIG. 15B. Thus, the signal routed to the transducer (104*a*) has substantially no delay and thus is the first signal to exit the array. The signal routed to the transducer (104*b*) has a small delay applied so this signal is the second to exit the array. The delays applied to the transducers (104*c*, 104*d*, 104*e* etc) successively increase so that there is a fixed delay between the outputs of adjacent transducers.

Such a series of delays produces a roughly parallel "beam" of sound similar to that produced in the first embodiment except that now the beam is angled by an amount dependent on the amount of systematic delay increase that was used. For very small delays ($t_n<<T_c$, n) the beam direction will be very nearly orthogonal to the array (105); for larger delays (max $t_n$)~$T_c$ the beam can be steered to be nearly tangential to the surface.

As already described, sound waves can be directed without focussing by choosing delays such that the same temporal parts of the sound waves (those parts of the sound waves representing the same information) from each transducer together form a front F travelling in a particular direction.

By reducing the amplitudes of the signals presented by a Distributor to the SETs located closer to the edges of the array (relative to the amplitudes presented to the SETs closer to the middle of the array), the level of the side lobes (due to the finite array size) in the radiation pattern may be reduced. For example, a Gaussian or raised cosine curve may be used to determine the amplitudes of the signals from each SET. A trade off is achieved between adjusting for the effects of finite array size and the decrease in power due to the reduced amplitude in the outer SETs.

Third Embodiment

If the signal delay applied by the signal delay means (1508) and/or the adaptive digital filter (1512) is chosen such that the sum of the delay plus the sound travel time from that SET (104) to a chosen point in space in front of the DPAA are for all of the SETs the same value—ie. so that sound waves arrive from each of the output transducers at the chosen point as in-phase sounds—then the DPAA may be caused to focus sound at that point, P. This is illustrated in FIG. 16C.

Figure 16C:
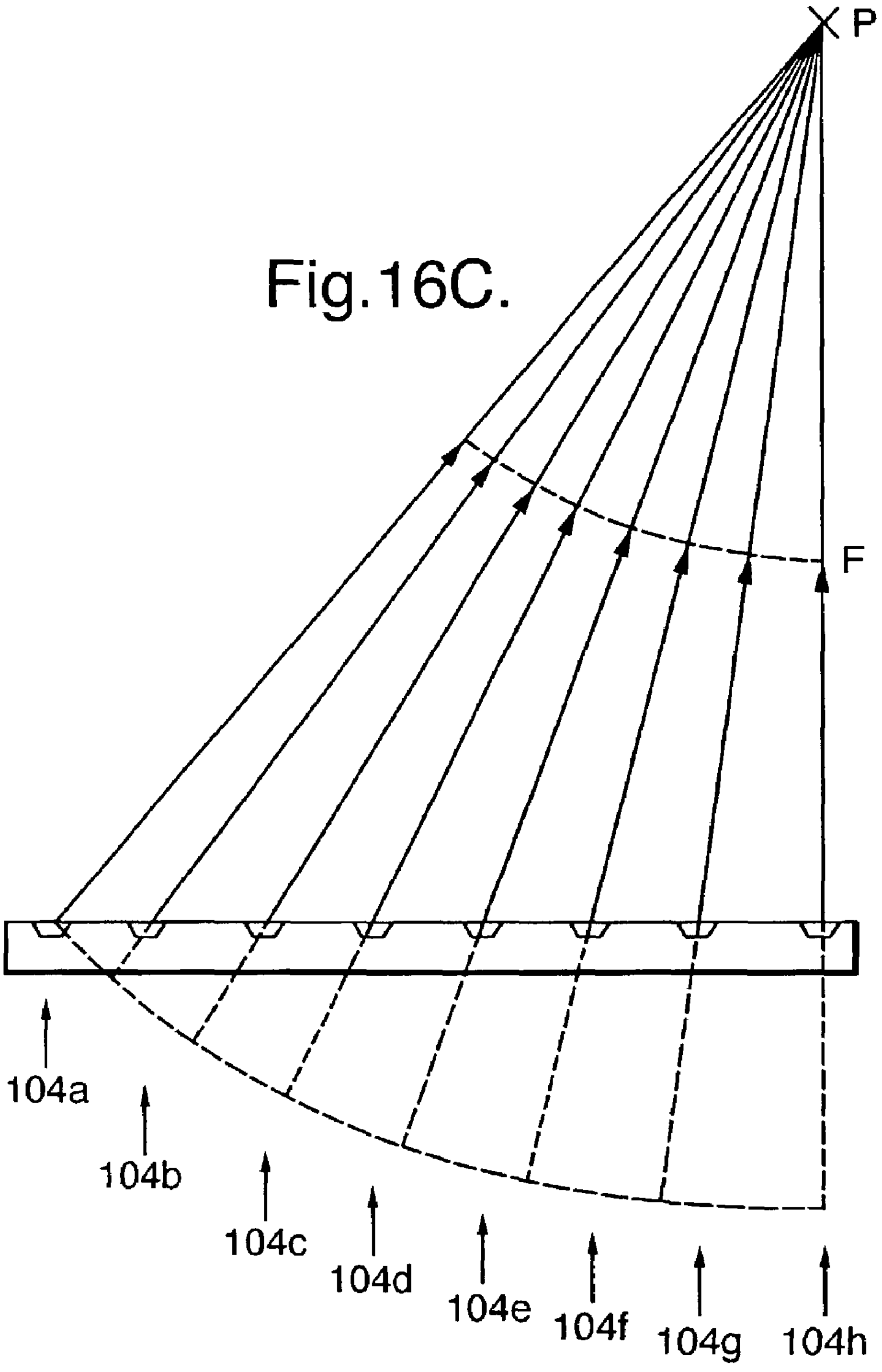

As can be seen from FIG. 16C, the delays applied at each of the output transducers (104*a* through 104*h*) again increase, although this time not linearly. This causes a curved wave front F which converges on the focus point such that the sound intensity at and around the focus point (in a region of dimensions roughly equal to a wavelength of each of the spectral components of the sound) is considerably higher than at other points nearby.

The calculations needed to obtain sound wave focussing can be generalised as follows:— focal point position vector, $$f = \begin{bmatrix} f_x \\ f_y \\ f_z \end{bmatrix}$$

nth transducer position, $$p_n = \begin{bmatrix} p_{nx} \\ p_{ny} \\ p_{nz} \end{bmatrix}$$

transit time for nth transducer, $$t_n = \frac{1}{c}\sqrt{(f - p_n)^T (f - p_n)}$$

required delay for each transducer, $d_n = k - t_n$ where k is a constant offset to ensure that all delays are positive and hence realisable.

The position of the focal point may be varied widely almost anywhere in front of the DPAA by suitably choosing the set of delays as previously described.

Fourth Embodiment

Figure 16D:
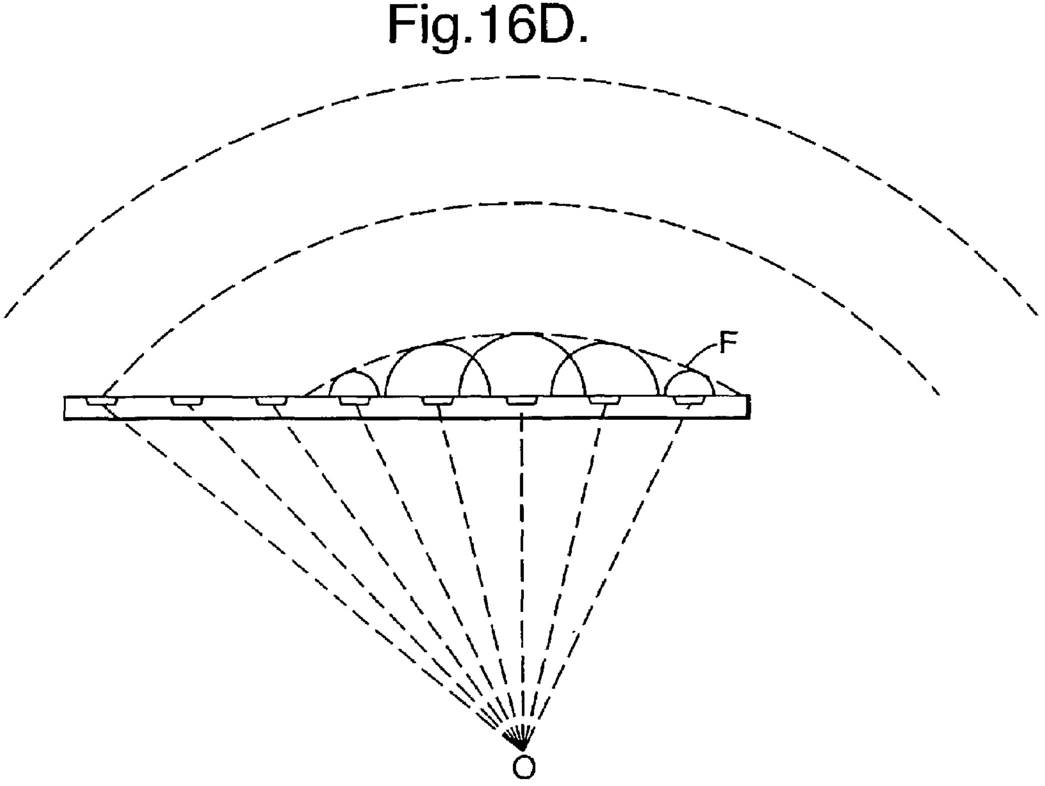

FIG. 16D shows a fourth embodiment of the first aspect wherein yet another rationale is used to determine the delays applied to the signals routed to each output transducer. In this embodiment, Huygens wavelet theorem is invoked to simulate a sound field which has an apparent origin O. This is achieved by setting the signal delay created by the signal delay means (1508) or the adaptive digital filter (1512) to be equal to the sound travel time from a point in space behind the array to the respective output transducer. These delays are illustrated by the dotted lines in FIG. 16D.

It will be seen from FIG. 16D that those output transducers located closest to the simulated origin position output a signal before those transducers located further away from the origin position. The interference pattern set up by the waves emitted from each of the transducers creates a sound field which, to listeners in the near field in front of the array, appears to originate at the simulated origin.

Hemispherical wave fronts are shown in FIG. 16D. These sum to create the wave front F which has a curvature and direction of movement the same as a wave front would have if it had originated at the simulated origin. Thus, a true sound field is obtained. The equation for calculating the delays is now:—

$$d_n = t_n - j$$

where $t_n$ is defined as in the third embodiment and j is an arbitrary offset.

It can be seen, therefore, that the method according to the first aspect of the invention involves using the replicator (1504) to obtain N replica signals, one for each of the N output transducers. Each of these replicas are then delayed (perhaps by filtering) by respective delays which are selected in accordance with both the position of the respective output transducer in the array and the effect to be achieved. The delayed signals are then routed to the respective output transducers to create the appropriate sound field.

The distributor (102) preferably comprises separate replicating and delaying means so that signals may be replicated and delays may be applied to each replica. However, other configurations are included in the present invention, for example, an input buffer with N taps may be used, the position of the tap determining the amount of delay.

The system described is a linear one and so it is possible to combine any of the above four effects by simply adding together the required delayed signals for a particular output transducer. Similarly, the linear nature of the system means that several inputs may each be separately and distinctly focussed or directed in the manner described above, giving rise to controllable and potentially widely separated regions where distinct sound fields (representative of the signals at the different inputs) may be established remote from the DPAA proper. For example, a first signal can be made to appear to originate some distance behind the DPAA and a second signal can be focussed on a position some distance in front of the DPAA.

Second Aspect of the Invention

The second aspect of the invention relates to the use of a DPAA not to direct or simulate the origin of sound, but to direct "anti-sound" so that quiet spots may be created in the sound field.

Such a method according to the second aspect can be particularly useful in a public address (PA) system which can suffer from "howl" or positive electro-acoustic feedback whenever a loudspeaker system is driven by amplified signals originating from microphones physically disposed near the loudspeakers.

In this condition, a loudspeaker's output reaches (often in a fairly narrow frequency band), and is picked up by, a microphone, and is then amplified and fed to the loudspeaker, and from which it again reaches the microphone . . . and where the received signal's phase and frequency matches the present microphone signal's output the combined signal rapidly builds up until the system saturates, and emits a loud and unpleasant whistling, or "howling" noise.

Anti-feedback or anti-howlround devices are known for reducing or suppressing acoustic feedback. They can operate in a number of different ways. For example, they can reduce the gain—the amount of amplification—at specific frequencies where howl-round occurs, so that the loop gain at those frequencies is less than unity. Alternatively, they can modify the phase at such frequencies, so that the loudspeaker output tends to cancel rather than add to the microphone signal.

Another possibility is the inclusion in the signal path from microphone to loudspeaker of a frequency-shifting device (often producing a frequency shift of just a few hertz), so that the feedback signal no longer matches the microphone signal.

None of these methods is entirely satisfactory, and the second aspect of the invention proposes a new way, appropriate in any situation where the microphone/loudspeaker system employs a plurality of individual transducer units arranged as an array and in particular where the loudspeaker system utilises a multitude of such transducer units as disclosed in, say, the Specification of International Patent Publication WO 96/31,086. More specifically, the second aspect of the invention suggests that the phase and/or the amplitude of the signal fed to each transducer unit be arranged such that the effect on the array is to produce a significantly reduced "sensitivity" level in one or more chosen direction (along which may actually or effectively lie a microphone) or at one or more chosen points. In other words, the second aspect of the invention proposes in one embodiment that the loudspeaker unit array produces output nulls which are directed wherever there is a microphone that could pick up the sound and cause howl, or where for some reason it is undesirable to direct a high sound level.

Figure 17:
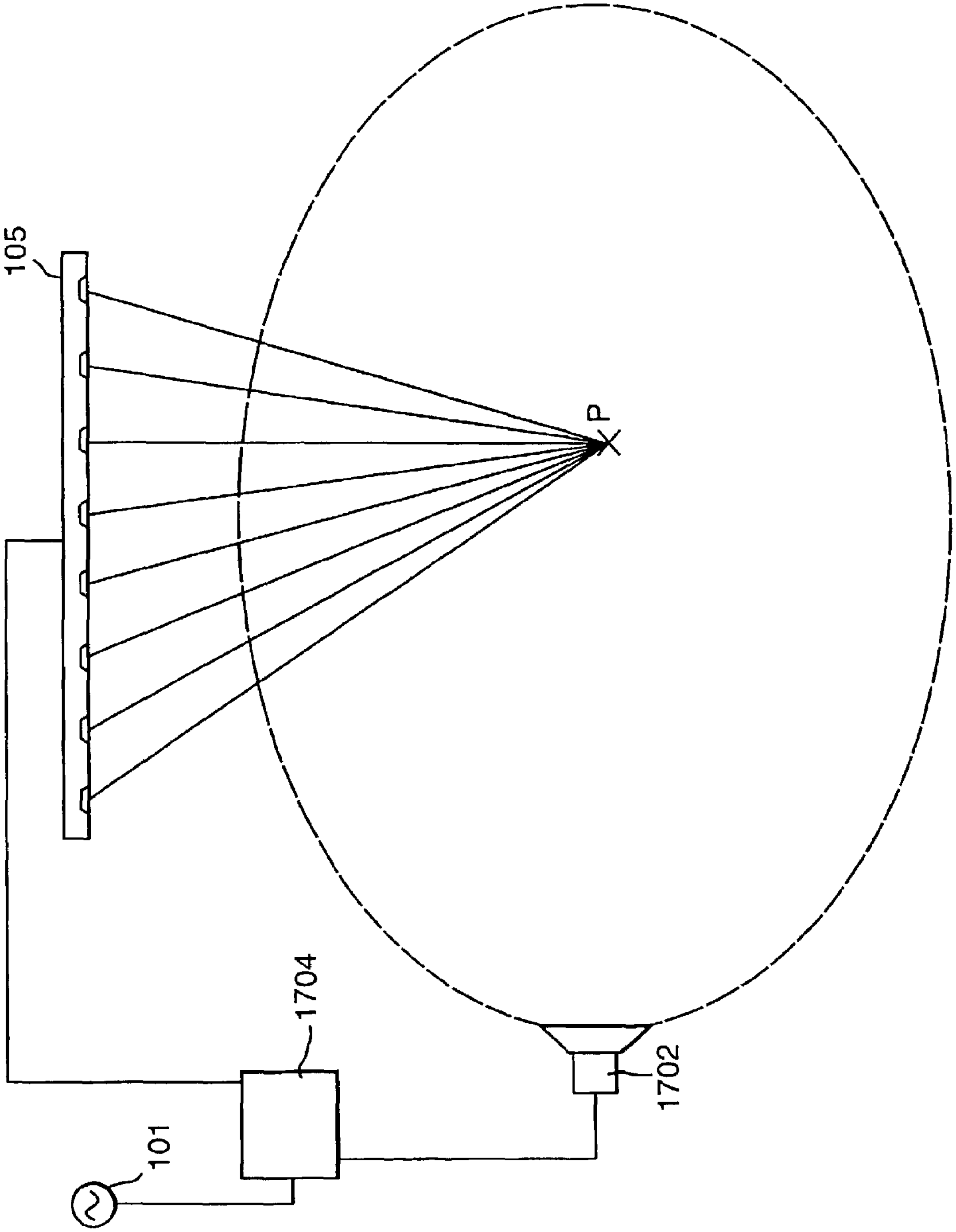
FIG. 17 shows apparatus for selectively nulling a signal output by a loudspeaker.

Sound waves may be cancelled (ie. nulls can be formed) by focussing or directing inverted versions of the signal to be cancelled to particular positions. The signal to be cancelled can be obtained by calculation or measurement. Thus, the method of the second aspect of the present invention generally uses the apparatus of FIG. 1 to provide a directional sound field provided by an appropriate choice of delays. The signals output by the various transducers (104) are inverted and scaled versions of the sound field signal so that they tend to cancel out signals in the sound field derived from the uninverted input signal. An example of this mechanism is shown in FIG. 17. Here, an input signal (101) is input to a controller (1704). The controller routes the input signal to a traditional loudspeaker (1702), possibly after applying a delay to the input signal. The loudspeaker (1702) outputs sound waves derived from the input signal to create a sound field (1706). The DPAA (104) is arranged to cause a substantially silent spot within this sound field at a so-called "null" position P. This is achieved by calculating the value of sound pressure at the point P due to the signal from loudspeaker (1702). This signal is then inverted and focussed at the point P (see FIG. 17) using the methods similar to focussing normal sound signals described in accordance with the first aspect of the invention. Almost total cancelling may be achieved by calculating or measuring the exact level of the sound field at position P and scaling the inverted signal so as to achieve more precise cancellation.

The signal in the sound field which is to be cancelled will be almost exactly the same as the signal supplied to the loudspeaker (1702) except it will be affected by the impulse response of the loudspeaker as measured at the nulling point (it is also affected by the room acoustics, but this will be neglected for the sake of simplicity). It is therefore useful to have a model of the loudspeaker impulse response to ensure that the nulling is carried out correctly. If a correction to account for the impulse response is not used, it may in fact reinforce the signal rather than cancelling it (for example if it is 180° out of phase). The impulse response (the response of the loudspeaker to a sharp impulse of infinite magnitude and infinitely small duration, but nonetheless having a finite area) generally consists of a series of values represented by samples at successive times after the impulse has been applied. These values may be scaled to obtain the coefficients of an FIR filter which can be applied to the signal input to the loudspeaker (1702) to obtain a signal corrected to account for the impulse response. This corrected signal may then be used to calculate the sound field at the nulling point so that appropriate anti-sound can be beamed. The sound field at the nulling point is termed the "signal to be cancelled".

Since the FIR filter mentioned above causes a delay in the signal flow, it is useful to delay everything else to obtain proper synchronisation. In other words, the input signal to the loudspeaker (1702) is delayed so that there is time for the FIR filter to calculate the sound field using the impulse response of the loudspeaker (1702).

The impulse response can be measured by adding test signals to the signal sent to the loudspeaker (1702) and measuring them using an input transducer at the nulling point. Alternatively, it can be calculated using a model of the system.

Figure 18:
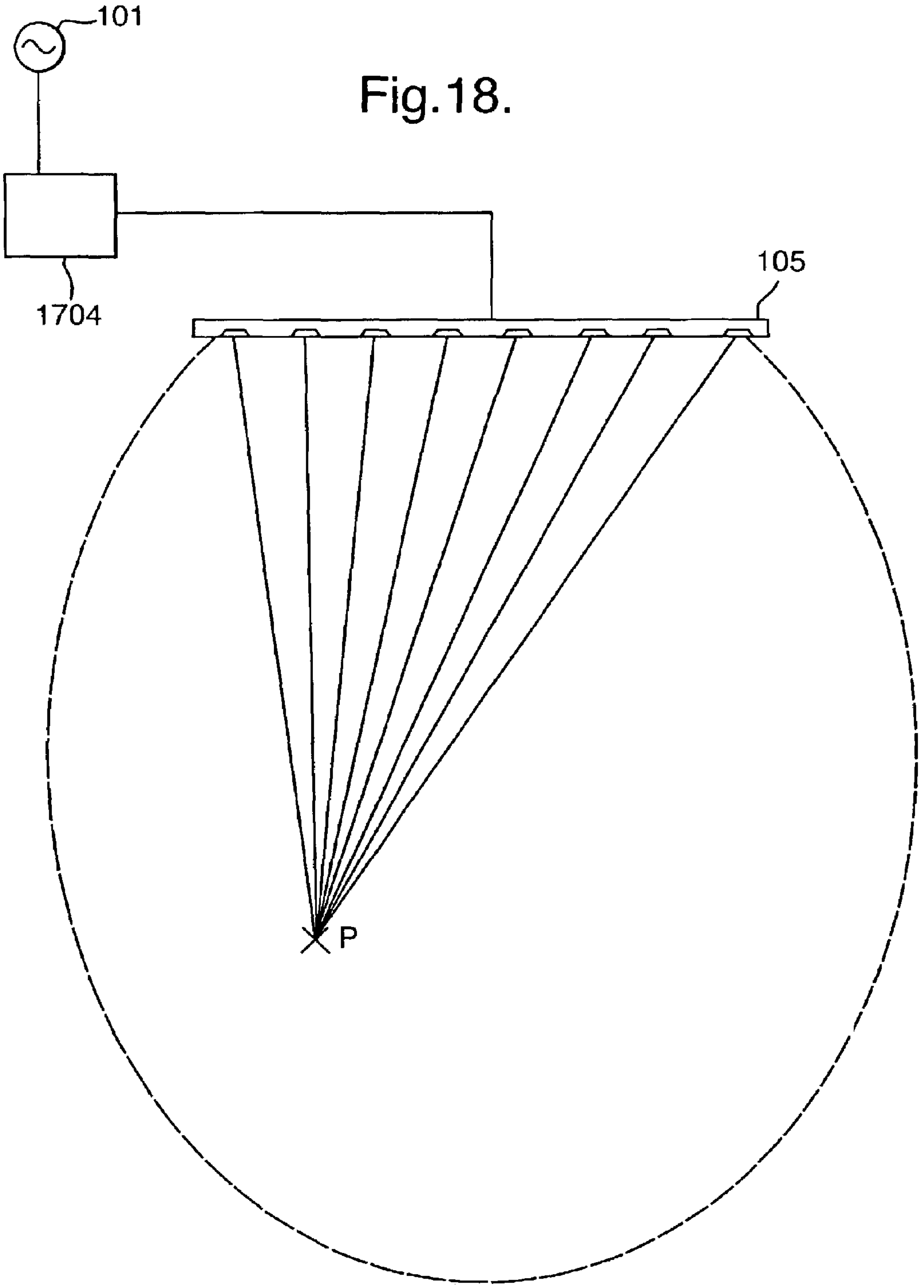
FIG. 18 shows apparatus for selectively nulling a signal output by an array of output transducers.

Another embodiment of this aspect of the invention is shown in FIG. 18. Here, instead of using a separate loudspeaker (1702) to create the initial sound field, the DPAA is also used for this purpose. In this case, the input signal is replicated and routed to each of the output transducers. The magnitude of the sound signal at the position P is calculated quite easily, since the sound at this position is due solely to the DPAA output. This is achieved by firstly calculating the transit time from each of the output transducers to the nulling point. The impulse response at the nulling point consists of the sum of each impulse response for each output transducer, delayed and filtered as the input signal will create the initial sound field, then further delayed by the transit time to the nulling point and attenuated due to $1/r^2$ distance effects.

Strictly speaking, this impulse response should be convolved (ie filtered) with the impulse response of the individual array transducers. However, the nulling signal is reproduced through those same transducers so it undergoes the same filtering at that stage. If we are using a measured (see below), rather than a model based impulse response for the nulling, then it is usually necessary to deconvolve the measured response with the impulse response of the output transducers.

The signal to be cancelled obtained using the above mentioned considerations is inverted and scaled before being again replicated. These replicas then have delays applied to them so that the inverted signal is focussed at the position P. It is usually necessary to further delay the original (uninverted) input signal so that the inverted (nulling) signal can arrive at the nulling point at the same time as the sound field it is designed to null. For each output transducer, the input signal replica and the respective delayed inverted input signal replica are added together to create an output signal for that transducer.

Figure 19:
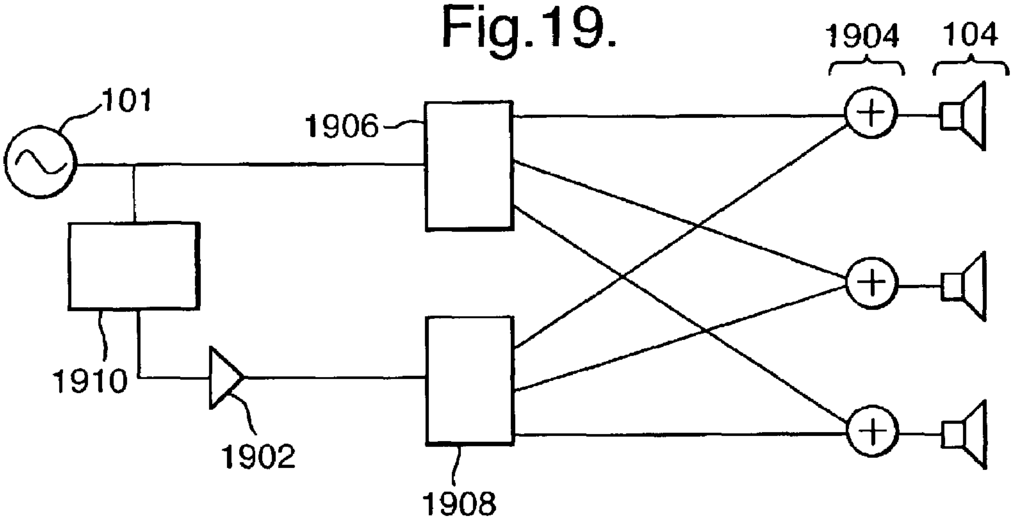
FIG. 19 is a block diagram of apparatus to implement selective nulling.

Apparatus to achieve this effect is shown in FIG. 19. The input signal (101) is routed to a first Distributor (1906) and a processor (1910). From there it is routed to an inverter (1902) and the inverted input signal is routed to a second Distributor (1908). In the first Distributor (1906) the input signal is passed without delay, or with a constant delay to the various adders (1904). Alternatively, a set of delays may be applied to obtain a directed input signal. The processor (1910) processes the input signal to obtain a signal representative of the sound field that will be established due to the input signal (taking into account any directing of the input signal). As already mentioned, this processing will in general comprise using the known impulse response of the various transducers, the known delay time applied to each input signal replica and the known transit times from each transducer to the nulling point to determine the sound field at the nulling point. The second Distributor (1908) replicates and delays the inverted sound field signal and the delayed replicas are routed to the various adders (1904) to be added to the outputs from the first Distributor. A single output signal is then routed to each of the output transducers (104). As mentioned, the first distributor (1906) can provide for directional or simulated origin sound fields. This is useful when it is desired to direct a plurality of soundwaves in a particular direction, but it is necessary to have some part of the resulting field which is very quiet.

Since the system is linear, the inverting carried out in the invertor (1902) could be carried out on each of the replicas leaving the second distributor. Clearly though, it is advantageous to perform the inverting step before replicating since only one invertor (1902) is then required. The inversion step can also be incorporated into the filter. Furthermore, if the Distributor (1906) incorporates ADFs, both the initial sound field and the nulling beam can be produced by it, by summing the filter coefficients relating to the initial sound field and to the nulling beam.

Figure 20:
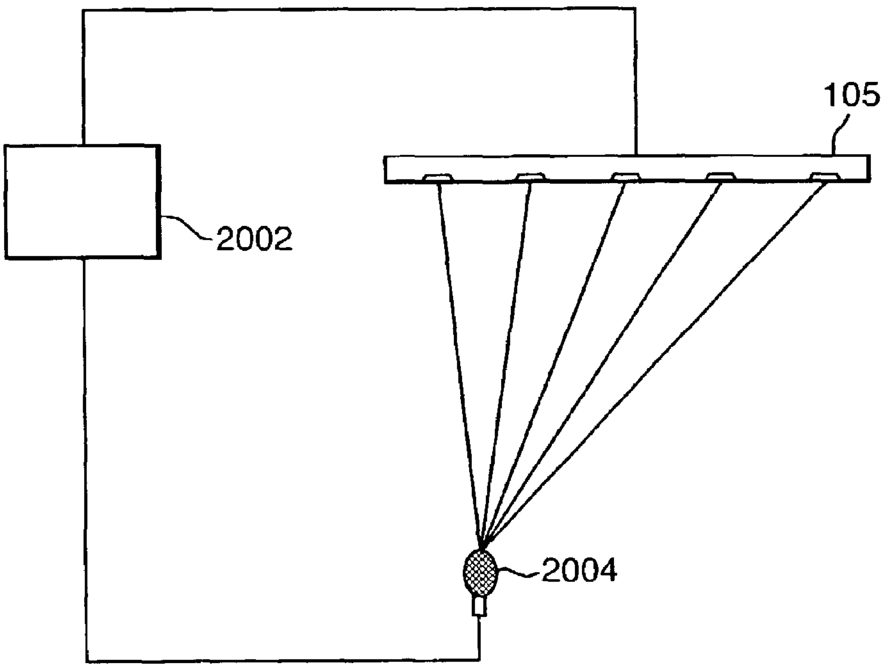
FIG. 20 shows the focussing of a null on a microphone to reduce howling.

A null point may be formed within sound fields which have not been created by known apparatus if an input transducer (for example a microphone) is used to measure the sound at the position of interest. FIG. 20 shows the implementation of such a system. A microphone (2004) is connected to a controller (2002) and is arranged to measure the sound level at a particular position in space. The controller (2002) inverts the measured signal and creates delayed replicas of this inverted signal so as to focus the inverted signal at the microphone location. This creates a negative feedback loop in respect of the sound field at the microphone location which tends to ensure quietness at the microphone location. Of course, there will be a delay between the actual sound (for example due to a noisy room) detected by the microphone (2004) and the soundwaves representing the inverted detected signal arriving at the microphone location. However, for low frequencies, this delay is tolerable. To account for this effect, the signal output by the output transducers (104) of the DPAA could be filtered so as to only comprise low frequency components.

The above embodiments describe the concept of "nulling" using an inverted (and possibly scaled) sound field signal which is focussed at a point. However, more general nulling could comprise directing a parallel beam using a method similar to that described with reference to the first and second embodiments of the first aspect.

The advantages of the array or the invention are manifold. One such advantage is that sound energy may be selectively NOT directed, and so "quiet spots" may be produced, whilst leaving the energy directed into the rest of the surrounding region largely unchanged (though, as already mentioned, it may additionally be shaped to form a positive beam or beams). This is particularly useful in the case where the signals fed to the loudspeaker are derived totally or in part from microphones in the vicinity of the loudspeaker array: if an "anti-beam" is directed from the speaker array towards such a microphone, then the loop-gain of the system, in this direction or at this point alone, is reduced, and the likelihood of howl-round may be reduced; ie. a null or partial null is located at or near to the microphone. Where there are multiple microphones, as in common on stages, or at conferences, multiple anti-beams may be so formed and directed at each of the microphones.

A third benefit is also seen, when, where one or more regions of the listening area is adversely affected by reflections off walls or other boundaries, anti-beams may be directed at those boundaries to reduce the adverse effects of any reflections therefrom, thus improving the quality of sound in the listening area.

A problem may arise with the speaker system of the invention where the wavelength of the sound being employed is at an extreme compared with the physical dimensions of the array. Thus, where the array-extent in one or both of the principal 2D dimensions of the transducer array is such that it is smaller than one or a few wavelengths of sound below a given frequency (Fc) within the useful range of use of the system, then its ability to produce significant directionality in either or both of those dimensions will be somewhat or even greatly reduced. Moreover, where the wavelength is very large compared to one or both of the associated dimensions, the directionality will be essentially zero. Thus, the array is in any case ineffective for directional purposes below frequency Fc. Worse, however, is that an unwanted side-effect of the transducer array being used to produce anti-beams is that, at frequencies much below Fc, the output energy in all directions can be unintentionally much reduced, because the transducer array, considered as a radiator, now has multiple positively- and negatively-phased elements spatially separated by much less than a wavelength, producing destructive interference the effect of which is largely to cancel the radiation in many if not all directions in the far field—which is not what is desired in the production of anti-beams. It should be noted that normal low frequency signals may be steered without much effect on the output power. It is only when nulling that the above described power problem emerges.

To deal with this special case, then, the driving signal to the transducer array should first be split into frequencies-below-frequency Fs (BandLow) and frequencies-above-Fs (BandHigh), where Fs is somewhere in the region of Fc (ie. where the array starts to interfere destructively in the far field due to its small size compared to the wavelength of signals of frequency below Fs). Then, the BandHigh signals are fed to the transducer array elements in the standard manner via the delaying elements, whilst the BandLow signals are directed separately around the delay elements and fed directly to all the output transducers in the array (summed with the output of its respective BandHigh signal at each transducer). In this manner, the lower frequencies below Fs are fed in-phase across the whole array to the elements and do not destructively interfere in the far field, whilst the higher frequencies above Fs are beamed and anti-beamed by the one or more groups of SDMs to produce useful beaming and anti-beaming in the far-field, with the lower frequency output now remaining intact. Embodiments of the invention which utilise such frequency dividing are described later with reference to the fifth aspect of the invention.

The apparatus of FIG. 20 and of FIG. 18 may be combined such that the input signal detected at the microphone (2004) is generally output by the transducers (104) of the DPAA but with cancellation of this output signal at the location of the microphone itself. As discussed, there would normally be probability of howl-round (positive electro-acoustic feedback) were the system gain to be set above a certain level. Often this limiting level is sufficiently low that users of the microphone have to be very close for adequate sensitivity, which can be problematical. However, with the DPAA set to produce nulls or anti-beams in the direction of the microphone, this undesirable effect can be greatly reduced, and the system gain increased to a higher level giving more useful sensitivity.

Third Aspect of the Invention

The third aspect of the invention relates to the use of a DPAA system to create a surround sound or stereo effect using only a single sound emitting apparatus similar to the apparatus already described in relation to the first and second aspects of the invention. Particularly, the third aspect of the invention relates to directing different channels of sound in different directions so that the soundwaves impinge on a reflective or resonant surface and are re-transmitted thereby.

This third aspect of the invention addresses the problem that where the DPAA is operated outdoors (or any other place having substantially anechoic conditions) an observer needs to move close to those regions in which sound has been focussed in order to easily perceive the separate sound fields. It is otherwise difficult for the observer to locate the separate sound fields which have been created.

If an acoustic reflecting surface, or alternatively an acoustically resonant body which re-radiates absorbed incident sound energy, is placed in such a focal region, it re-radiates the focussed sound, and so effectively becomes a new sound source, remote from the DPAA, and located at the focal region. If a plane reflector is used then the reflected sound is predominantly directed in a specific direction; if a diffuse reflector is present then the sound is re-radiated more or less in all directions away from the focal region on the same side of the reflector as the focussed sound is incident from the DPAA. Thus, if a number of distinct sound signals representative of distinct input signals are focussed to distinct focal regions by the DPAA in the manner described, and within each focal region is placed such a reflector or resonator so as to redirect the sound from each focal region, then a true multiple separated-source sound radiator system may be constructed using a single DPAA of the design described herein. It is not essential to focus sound, instead sound can be directed in the manner of the second embodiment of the first aspect of the present invention.

Where the DPAA is operated in the manner previously described with multiple separated focussed beams—ie. with sound signals representative of distinct input signals focussed in distinct and separated regions—in non-anechoic conditions (such as in a normal room environment) wherein there are multiple hard and/or predominantly sound reflecting boundary surfaces, and in particular where those focussed regions are directed at one or more of the reflecting boundary surfaces, then using only his normal directional sound perceptions an observer is easily able to perceive the separate sound fields, and simultaneously locate each of them in space at their respective separate focal regions, due to the reflected sounds (from the boundaries) reaching the observer from those regions.

It is important to emphasise that in such a case the observer perceives real separated sound fields which in no way rely on the DPAA introducing artificial psycho-acoustic elements into the sound signals. Thus, the position of the observer is relatively unimportant for true sound location, so long as he is sufficiently far from the near-field radiation of the DPAA. In this manner, multi-channel "surround-sound" can be achieved with only one physical loudspeaker (the DPAA), making use of the natural boundaries found in most real environments.

Where similar effects are to be produced in an environment lacking appropriate natural reflecting boundaries, similar separated multi-source sound fields can be achieved by the suitable placement of artificial reflecting or resonating surfaces where it is desired that a sound source should seem to originate, and then directing beams at those surfaces. For example, in a large concert hall or outside environment optically-transparent plastic or glass panels could be placed and used as sound reflectors with little visual impact. Where wide dispersion of the sound from those regions is desired, a sound scattering reflector or broadband resonator could be introduced instead (this would be more difficult but not impossible to make optically transparent).

Figure 21:
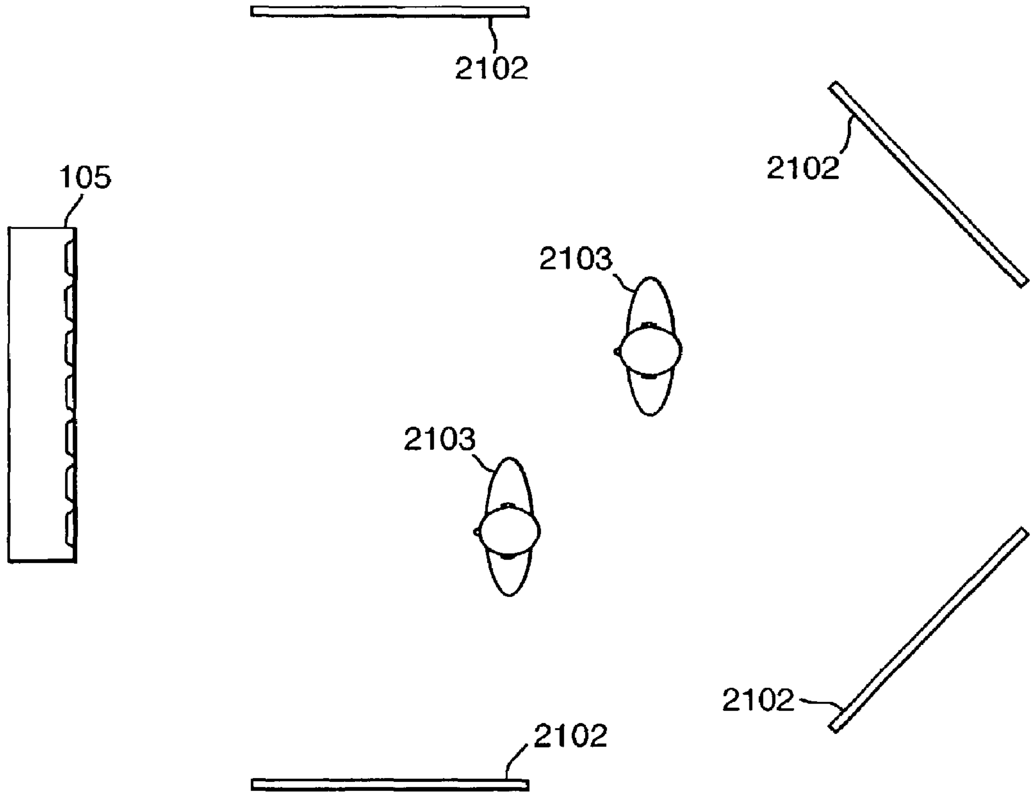
FIG. 21 shows a plan view of an array of output transducers and reflective/resonant screens to achieve a surround sound effect.

FIG. 21 illustrates the use of a single DPAA and multiple reflecting or resonating surfaces (2102) to present multiple sources to listeners (2103). As it does not rely on psychoacoustic cues, the surround sound effect is audible throughout the listening area.

In the case where focussing, rather than mere directing, is used, a spherical reflector having a diameter roughly equivalent to the size of the focus point can be used to achieve diffuse reflection over a wide angle. To further enhance the diffuse reflection effect, the surfaces should have a roughness on the scale of the wavelength of sound frequency it is desired to diffuse.

This third aspect of the invention can be used in conjunction with the second aspect of the invention to provide that anti-beams of the other channels may be directed towards the reflector associated with a given channel. So, taking the example of a stereo (2-channel system), channel 1 may be focussed at reflector 1 and channel 2 may be focussed at reflector 2 and appropriate nulling would be included to null channel 1 at reflector 2 and null channel 2 at reflector 1. This would ensure that only the correct channels have significant energy at the respective reflective surface.

The great advantage of this aspect of the present invention is that all of the above may be achieved with a single DPAA apparatus, the output signals for each transducer being built up from summations of delayed replicas of (possibly corrected and inverted) input signals. Thus, much wiring and apparatus traditionally associated with surround sound systems is dispensed with.

Fourth Aspect of the Invention

The fourth aspect of the invention relates to the use of microphones (input transducers) and test signals to locate the position of a microphone in the vicinity of an array of output transducers or the position of a loudspeaker in the vicinity of an array of microphones.

In accordance with this aspect, one or more microphones are provided that are able to sense the acoustic emission from the DPAA, and which are connected to the DPAA control electronics either by wired or wireless means. The DPAA incorporates a subsystem arranged to be able to compute the location of the microphone(s) relative to one or more DPAA SETs by measuring the propagation times of signals from three or more (and in general from all of the) SETs to the microphone and triangulating, thus allowing the possibility of tracking the microphone movements during use of the DPAA without interfering with the listener's perception of the programme material sound. Where the DPAA SET array is open-backed—ie. it radiates from both sides of the transducer in a dipole like manner—the potential ambiguity of microphone position, in front of or behind the DPAA, may be resolved by examination of the phase of the received signals (especially at the lower frequencies).

The speed of sound, which changes with air temperature during the course of a performance, affecting the acoustics of the venue and the performance of the speaker system, can be determined in the same process by using an additional triangulation point. The microphone locating may either be done using a specific test pattern (eg. a pseudo-random noise sequence or sequence of short pulses to each of the SETs in turn, where the pulse length $t_p$ is as short or shorter than the spatial resolution $r_s$ required, in the sense that $t_p \leqq r_s/c_s$) or by introducing low level test signals (which may be designed to be inaudible) with the programme material being broadcast by the DPAA, and then detecting these by cross-correlation.

A control system may be added to the DPAA that optimises (in some desired sense) the sound field at one or more specified locations, by altering the delays applied by the SDMs and/or the filter coefficients of the ADFs. If the previously described microphones are available, then this optimisation can occur either at set-up time—for instance during pre-performance use of the DPAA)—or during actual use. In the latter case, one or more of the microphones may be embedded in the handset used otherwise to control the DPAA, and in this case the control system may be designed actively to track the microphone in real-time and so continuously to optimise the sound at the position of the handset, and thus at the presumed position of at least one of the listeners. By building into the control system a model (most likely a software model) of the DPAA and its acoustic characteristics, plus optionally a model of the environment in which it is currently situated (ie. where it is in use, eg. a listening room), the control system may use this model to estimate automatically the required adjustments to the DPAA parameters to optimise the sound at any user-specified positions to reduce any troublesome side lobes.

The control system just described can additionally be made to adjust the sound level at one or more specific locations—eg. positions where live performance microphones are situated, which are connected to the DPAA, or positions where there are known to be undesired reflecting surfaces—to be minimised, creating "dead-zones". In this way unwanted mic/DPAA feedback can be avoided, as can unwanted room reverberations. This possibility has been discussed in the section relating to the second aspect of the invention.

By using buried test-signals—that is, additional signals generated in the DPAA electronics which are designed to be largely imperceptible to the audience, and typified by low level pseudo-random noise sequences, which are superimposed on the programme signals—one or more of the live performance microphones can be spatially tracked (by suitable processing of the pattern of delays between said microphones and the DPAA transducers). This microphone spatial information may in turn be used for purposes such as positioning the "dead-zones" wherever the microphones are moved to (note that the buried test-signals will of necessity be of non-zero amplitude at the microphone positions).

Figure 22:
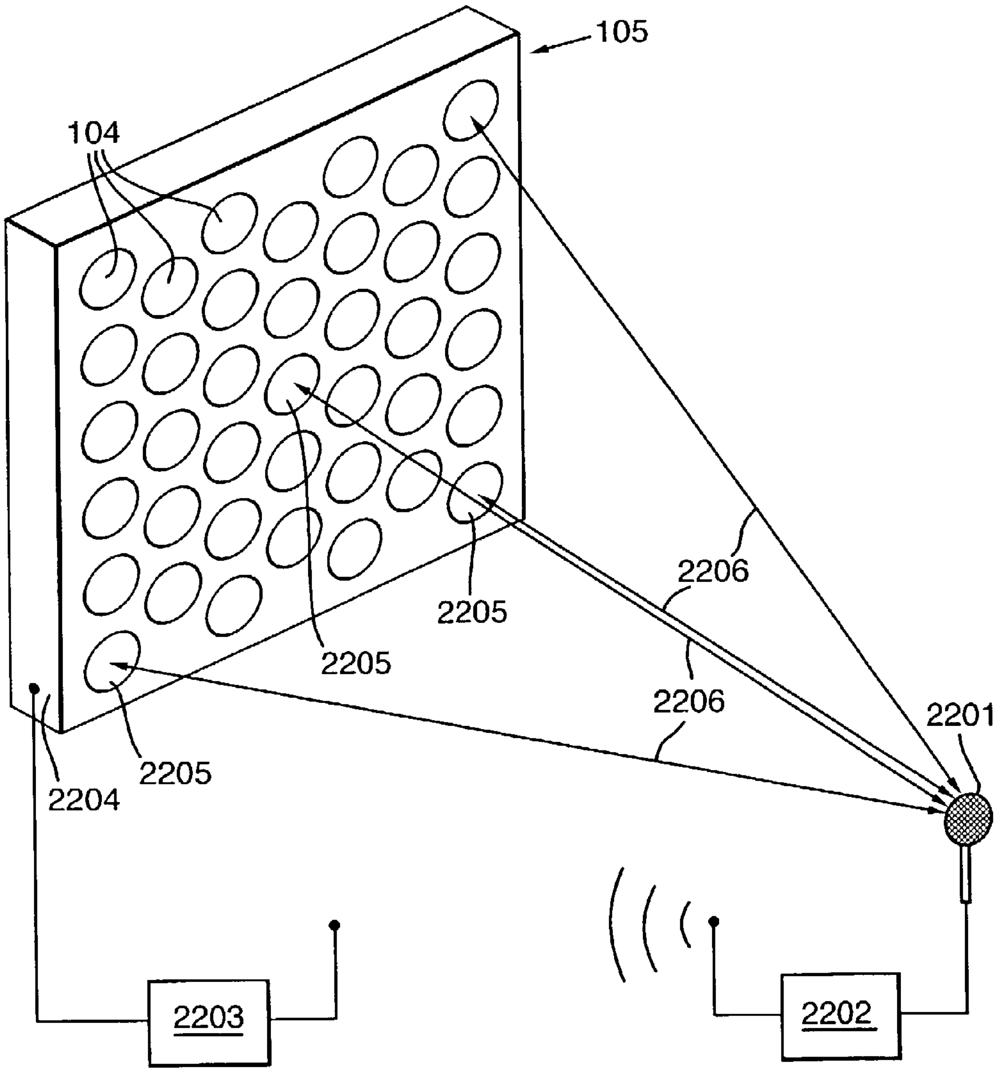
FIG. 22 illustrates apparatus to locate the position of an input transducer using triangulation.

FIG. 22 illustrates a possible configuration for the use of a microphone to specify locations in the listening area. The microphone (2201) is connected an analogue or digital input (2204) of the DPAA (105) via a radio transmitter (2202) and receiver (2203). A wired or other wirefree connection could instead be used if more convenient. Most of the SETs (104) are used for normal operation or are silent. A small number of SETs (2205) emit test signals, either added to or instead of the usual programme signal. The path lengths (2206) between the test SETs and the microphone are deduced by comparison of the test signals and microphone signal, and used to deduce the location of the microphone by triangulation. Where the signal to noise ratio of the received test signals is poor, the response can be integrated over several seconds.

Figure 23:
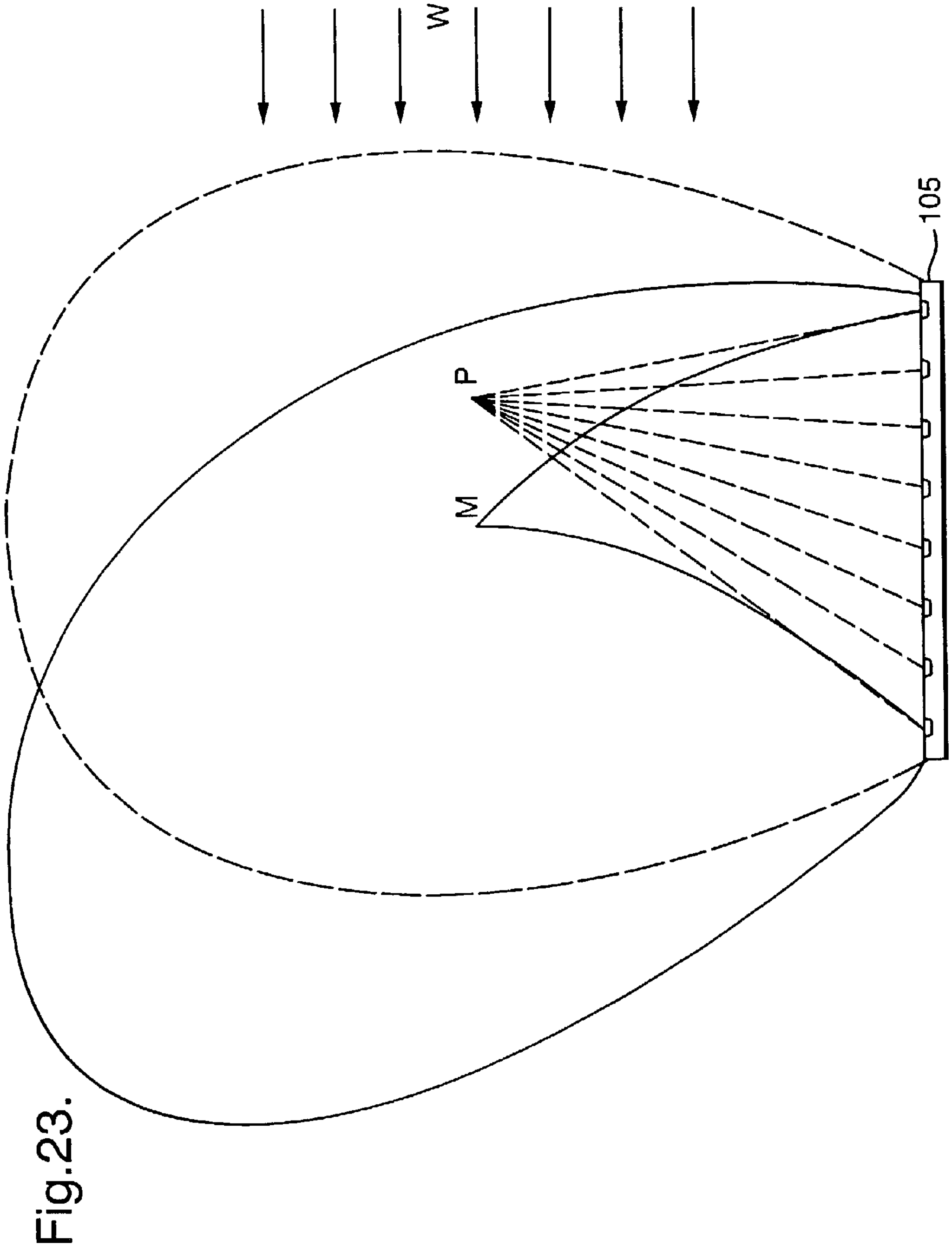
FIG. 23 illustrates in plan view the effect of wind on a sound field and apparatus to reduce this effect.

In outdoor performances, wind has a significant impact on the performance of loudspeaker systems. The direction of propagation of sound is affected by winds. In particular, wind blowing across an audience, at perpendicular to the desired direction of propagation of the sound, can cause much of the sound power to be delivered outside the venue, with insufficient coverage within. FIG. 23 illustrates this problem. The area 2302 surrounded by the dotted line indicates the sound field shape of the DPAA (105) in the absence of wind. Wind W blows from the right so that the sound field 2304 is obtained, which is a skewed version of field 2302.

With a DPAA system, the propagation of the microphone location finding signals are affected in the same manner by crosswinds. Hence, if a microphone M is positioned in the middle of the audience area, but a crosswind was blowing from the west, it would appear to the location finding system that the microphone is west of the audience area. Taking the example of FIG. 23, the wind W causes the test signals to take a curved path from the DPAA to the microphone. This causes the system to erroneously locate the microphone at position P, west of the true position M. To account for this, the radiation pattern of the array way is adjusted to optimise coverage around the apparent microphone location P, to compensate for the wind, and give optimum coverage in the actual audience area. The DPAA control system can make these adjustments automatically during the course of a performance. To ensure stability of the control system, only slow changes must be made. The robustness of the system can be improved using multiple microphones at known locations throughout the audience area. Even when the wind changes, the sound field can be kept substantially constantly directed in the desired way.

Where it is desired to position an apparent source of sound remote from the DPAA as previously described in relation to the third aspect of the invention (by the focussing a beam of sound energy onto a suitable reflecting surface), the use of the microphones previously described allows a simple way to set up this situation. One of the microphones is temporarily positioned near the surface which is to become the remote sound source, and the position of the microphone is accurately determined by the DPAA sub-system already described. The control system then computes the optimum array parameters to locate a focussed or directed beam (connected to one or more of the user-selected inputs) at the position of the microphone. Thereafter the microphone may be removed. The separate remote sound source will then emanate from the surface at the chosen location.

It is advantageous to have some degree of redundancy built into the system to provide more accurate results. For example, the time it takes the test signal to travel from each output transducer to the input transducer may generally be calculated for all of the output transducers in the array giving rise to many more simultaneous equations than there are variables to be solved (three spatial variables and the speed of sound). Values for the variables which yield the lowest overall error can be obtained by appropriate solving of the equations.

The test signals may comprise pseudo-random noise signals or inaudible signals which are added to delayed input signal replicas being output by the DPAA SETs or are output via transducers which do not output any input signal components.

The system according to the fourth aspect of the present invention is also applicable to a DPAA apparatus made up of an array of input transducers with an output transducer in the vicinity of that array. The output transducer can output only a single test signal which will be received by each of the input transducers in the array. The time between output of the test signal and its reception can then be used to triangulate the position of the output transducer and/or calculate the speed of sound.

Figure 24:
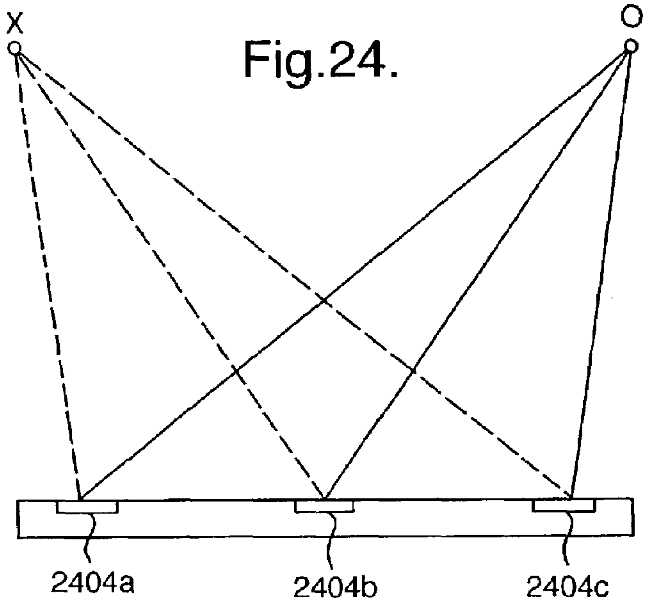
FIG. 24 shows in plan view an array of three input transducers which have an input null located at point O.

With this system, "input nulls" may be created. These are areas to which the input transducer array will have a reduced sensitivity. FIGS. 24 to 26 illustrate how such input nulls are set up. Firstly, the position O at which an input null should be located is selected. At this position, it should be possible to make noises which will not be picked up by the array of input transducers (2404) as a whole. The method of creating this input null will be described by referring to an array having only three input transducers (2404*a*, 2404*b* and 2404*c*), although many more would be used in practice.

Figure 25A:
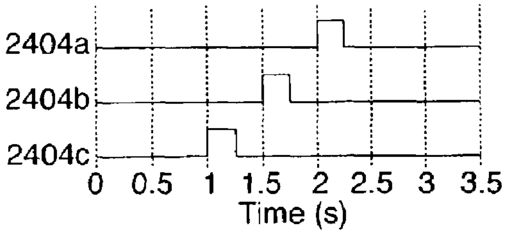
Figure 25B:
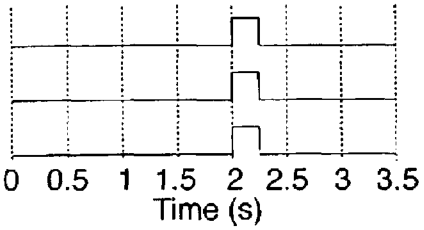
Figure 25C:
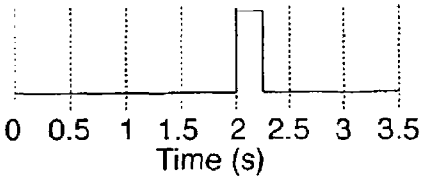
Figure 25D:
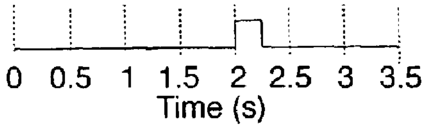
Figure 25E:
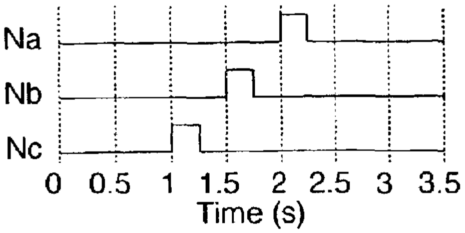
Figure 25F:
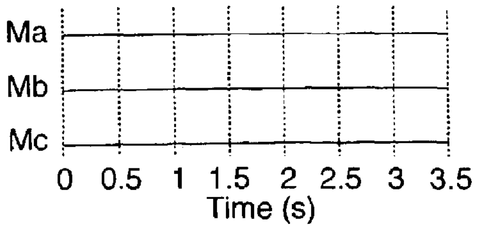

Firstly, the situation in which sound is emitted from a point source located at position O is considered. If a pulse of sound is emitted at time 0, it will reach transducer (2404*c*) first, then transducer (2404*b*) and then transducer (2404*a*) due to the different path lengths. For ease of explanation, we will assume that the pulse reaches transducer (2404*c*) after 1 second, transducer (2404*b*) after 1.5 seconds and transducer (2404*a*) after 2 seconds (these are unrealistically large figures chosen purely for ease of illustration). This is shown in FIG. 25A. These received input signals are then delayed by varying amounts so as to actually focus the input sensitivity of the array on the position 0. In the present case, this involves delaying the input received at transducer (2404*b*) by 0.5 seconds and the input received at transducer (2404*c*) by 1 second. As can be seen from FIG. 25B, this results in modifying all of the input signals (by applying delays) to align in time. These three input signals are then summed to obtain an output signal as shown in FIG. 25C. The magnitude of this output signal is then reduced by dividing the output signal by approximately the number of input transducers in the array. In the present case, this involves dividing the output signal by three to obtain the signal shown in FIG. 25D. The delays applied to the various input signals to achieve the signals shown in FIG. 25B are then removed from replicas of the output signal. Thus, the output signal is replicated and advanced by varying amounts which are the same as the amount of delay that was applied to each input signal. So, the output signal in FIG. 25D is not advanced at all to create a first nulling signal Na. Another replica of the output signal is advanced by 0.5 seconds to create nulling signal Nb and a third replica of the output signal is advanced by 1 second to create nulling signal Nc. The nulling signals are shown in FIG. 25E.

As a final step, these nulling signals are subtracted from the respective input signals to provide a series of modified input signals. As you might expect for the case of sound originating at point O, the nulling signals in the present example are exactly the same as input signals and so three modified signals having substantially zero magnitude are obtained. Thus, it can be seen that the input nulling method of the fourth aspect of the present invention serves to cause the DPAA to ignore signals emitted from position O where an input null is located.

Signals emanating from positions in the sound field other than O will not be reduced to zero as will be shown by considering how the method of the present invention processes signals obtained at the input transducers due to a sound source located at position X in FIG. 24. Sound emanating from position X arrives firstly at transducer (2404*a*) then at transducer (2404*b*) and finally at transducer (2404*c*). This is idealised by the sound pulses shown in FIG. 26A. According to the input nulling method, these received signals are delayed by amounts which focus sensitivity on the position O. Thus, the signal at transducer (2404*a*) is not delayed, the signal at transducer (2404*b*) is delayed by 0.5 seconds and the signal at transducer (2404*b*) is delayed by 1 second. The signals which result from this are shown in FIG. 25B.

Figure 26A:
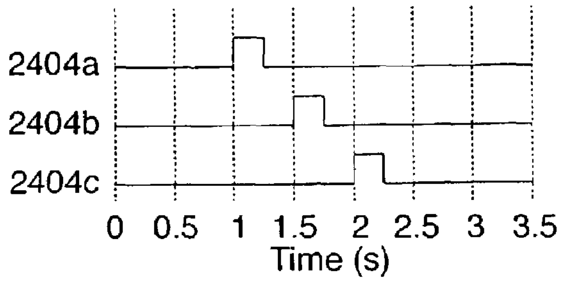
Figure 26B:
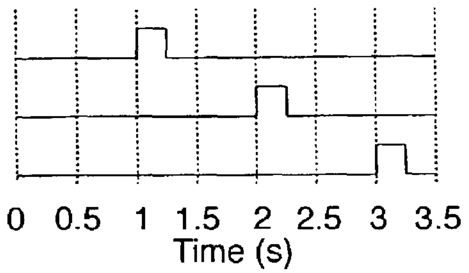
Figure 26C:
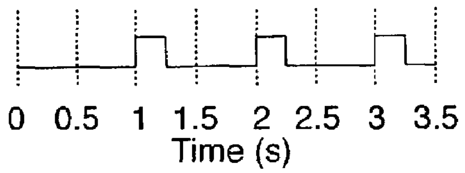
Figure 26D:
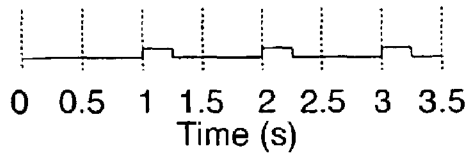
Figure 26E:
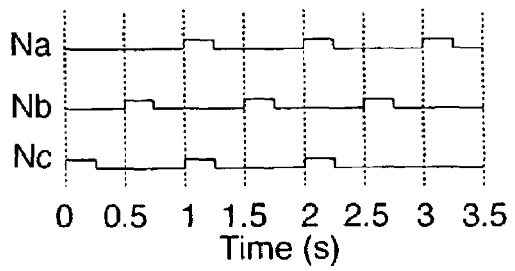
Figure 26F:
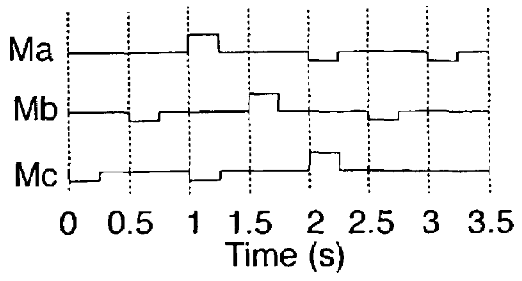

These three signals are then added together to achieve the output signal shown in FIG. 26C. This output signal is then divided by the approximate number of input transducers so as to reduce its magnitude. The resulting signal is shown in FIG. 26D. This resulting signal is then replicated and each replica is advanced by the amounts which the input signals were delayed by to achieve the signals shown in FIG. 26B. The three resulting signals are shown in FIG. 26E. These nulling signals Na, Nb and Nc are then subtracted from the original input signals to obtain modified input signals Ma, Mb and Mc. As can be seen from the resulting signal shown in FIG. 26F, the input pulses are changed only negligibly by the modification. The input pulses themselves are reduced to two thirds of their original level and other negative pulses of one third of the original pulse level have been added as noise. For a system using many input transducers, the pulse level will in general be reduced by (N−1)/(N) of a pulse and the noise will in general have a magnitude of (1/N) of a pulse. Thus, for say one hundred transducers, the effect of the modification is negligible when the sound comes from a point distal from the nulling position O. The signals of 26F can then be used for conventional beamforming to recover the signal from X.

The various test signals used with the fourth aspect of the present invention are distinguishable by applying a correlation function to the various input signals. The test signal to be detected is cross-correlated with any input signal and the result of such cross-correlation is analysed to indicate whether the test signal is present in the input signal. The pseudo-random noise signals are each independent such that no one signal is a linear combination of any number of other signals in the group. This ensures that the cross-correlation process identifies the test signals in question.

The test signals may desirably be formulated to have a non-flat spectrum so as to maximise their inaudibility. This can be done by filtering pseudo-random noise signals. Firstly, they may have their power located in regions of the audio band to which the ear is relatively insensitive. For example, the ear has most sensitivity at around 3.5 KHz so the test signals preferably have a frequency spectrum with minimal power near this frequency. Secondly, the masking effect can be used by adaptively changing the test signals in accordance with the programme signal, by putting much of the test signal power in parts of the spectrum which are masked.

FIG. 27 shows a block diagram of the incorporation of test signal generation and analysis into a DPAA. Test signals are both generated and analysed in block (2701). It has as inputs the normal input channels 101, in order to design test signals which are imperceptible due to a masking by the desired audio signal, and microphone inputs 2204. The usual input circuitry, such as DSRCs and/or ADCs have been omitted for clarity. The test signals are emitted either by dedicated SETs (2703) or shared SETs 2205. In the latter case the test signal is incorporated into the signal feeding each SET in a test signal insertion step (2702).

FIG. 28 shows two possible test signal insertion steps. The programme input signals (2801) come from a Distributor or adder. The test signals (2802) come from block 2701 in FIG. 27. The output signals (2803) go to ONSQs, non-linear compensators, or directly to amplifier stages. In insertion step (2804), the test signal is added to the programme signal. In insertion step (2805), the test signal replaces the programme signal. Control signals are omitted.

Fifth Aspect of the Invention

As has already been discussed in relation to the second aspect, it can sometimes be advantageous to split an input signal into two or more frequency bands and deal with these frequency bands separately in terms of the directivity which is achieved using the DPAA apparatus. Such a technique is useful not only when beam directing, but also when cancelling sound at a particular location to create nulls.

FIG. 29 illustrates the general apparatus for selectively beaming distinct frequency bands.

Input signal 101 is connected to a signal splitter/combiner (2903) and hence to a low-pass-filter (2901) and a high-pass-filter (2902) in parallel channels. Low-pass-filter (2901) is connected to a Distributor (2904) which connects to all the adders (2905) which are in turn connected to the N transducers (104) of the DPAA (105).

High-pass-filter (2902) connects to a device (102) which is the same as device (102) in FIG. 2 (and which in general contains within it N variable-amplitude and variable-time delay elements), which in turn connects to the other ports of the adders (2905).

The system may be used to overcome the effect of far-field cancellation of the low frequencies, due to the array size being small compared to a wavelength at those lower frequencies. The system therefore allows different frequencies to be treated differently in terms of shaping the sound field. The lower frequencies pass between the source/detector and the transducers (2904) all with the same time-delay (nominally zero) and amplitude, whereas the higher frequencies are appropriately time-delayed and amplitude-controlled for each of the N transducers independently. This allows anti-beaming or nulling of the higher frequencies without global far-field nulling of the low frequencies.

It is to be noted that the method according to the fifth aspect of the invention can be carried out using the adjustable digital filters (512). Such filters allow different delays to be accorded to different frequencies by simply choosing appropriate values for the filter coefficients. In this case, it is not necessary to separately split up the frequency bands and apply different delays to the replicas derived from each frequency band. An appropriate effect can be achieved simply by filtering the various replicas of the single input signal.

Sixth Aspect of the Invention

The sixth aspect of the invention addresses the problem that a user of the DPAA system may not always be easily able to locate where sound of a particular channel is being focussed at any particular time. This problem is alleviated by providing two steerable beams of light which can be caused to cross in space at the point where sound is being focussed. Advantageously, the beams of light are under the control of the operator and the DPAA controller is arranged to cause sound channel focussing to occur wherever the operator causes the light beams to intersect. This provides a very easy to set up system which does not rely on creating mathematical models of the room or other complex calculations.

If two light beams are provided, then they may be steered automatically by the DPAA electronics such that they intersect in space at or near the centre of the focal region of a channel, again providing a great deal of useful set-up feedback information to the operator.

It is useful to make the colours of the two beams different, and different primaries may be best, eg. red and green, so that in the overlap region a third colour is perceived.

Means to select which channel settings control the positions of the light beams should also be provided and these may all be controlled from the handset.

Where more than two light beams are provided, the focal regions of multiple channels may be high-lighted simultaneously by the intersection locations in space of pairs of the steerable light beams.

Small laser beams, particularly solid-state diode lasers, provide a useful source of collimated light.

Steering is easily achieved through small steerable mirrors driven by galvos or motors, or alternatively by a WHERM mechanism as described in the specification of the British Patent Application No. 0003,136.9.

FIG. 30 illustrates the use of steerable light beams (3003, 3004) emitted from projectors (3001, 3002) on a DPAA to show the point of focus (3005). If projector (3001) emits red light and (3002) green light, then yellow light will be seen at the point of focus.

Seventh Aspect of the Invention

If multiple sources are used simultaneously in a DPAA, to avoid clipping or distortion, it can be important to ensure that none of the summed signals presented to the SETs exceed the maximum excursion of the SET pistons or the full-scale digital level (FSDL) of the summing units, digital amplifiers, ONSQs or linear or non-linear compensators. This can be achieved straightforwardly by either scaling down or peak limiting each of the I input signals so that no peak can exceed 1/Ith of the full scale level. This approach caters for the worst case, where the input signals peak at the FSDL together, but severely limits the output power available to a single input. In most applications this is unlikely to occur except during occasional brief transients (such as explosions in a movie soundtrack). Better use can therefore be made of the dynamic range of the digital system if higher levels are used and overload avoided by peak limiting only during such simultaneous peaks.

A digital peak limiter is a system which scales down an input digital audio signal as necessary to prevent the output signal from exceeding a specified maximum level. It derives a control signal from the input signal, which may be sub-sampled to reduce the required computation. The control signal is smoothed to prevent discontinuities in the output signal. The rate at which the gain is decreased before a peak (the attack time constant) and returned to normal afterwards (the release time constant) are chosen to minimise the audible effects of the limiter. They can be factory-preset, under the control of the user, or automatically adjusted according to the characteristics of the input signal. If a small amount of latency can be tolerated, then the control signal can "look ahead" (by delaying the input signal but not the control signal), so that the attack phase of the limiting action can anticipate a sudden peak.

Since each SET receives sums of the input signals with different relative delays, it is not sufficient simply to derive the control signal for a peak limiter from a sum of the input signals, as peaks which do not coincide in one sum may do so in the delayed sums presented to one or more SETs. If independent peak limiters are used on each summed signal then, when some SETs are limited and others are not, the radiation pattern of the array will be affected.

This effect can be avoided by linking the limiters so that they all apply the same amount of gain reduction. This, however, is complex to implement when N is large, as it generally will be, and does not prevent overload at the summing point.

An alternative approach according to the seventh aspect of the invention is the Multichannel Multiphase Limiter (MML), a diagram of which is shown in FIG. 31. This apparatus acts on the input signals. It finds the peak level of each input signal in a time window spanning the range of delays currently implemented by the SDMs, then sums these I peak levels to produce its control signal. If the control signal does not exceed the FSDL, then none of the delayed sums presented to individual SETs can, so no limiting action is required. If it does, then the input signals should be limited to bring the level down to the FSDL. The attack and release time constants and the amount of lookahead can be either under the control of the user or factory-preset according to application.

If used in conjunction with ONSQ stages, the MML can act either before or after the oversampler.

Lower latency can be achieved by deriving the control signal from the input signals before oversampling, then applying the limiting action to the oversampled signals; a lower order, lower group delay anti-imaging filter can be used for the control signal, as it has limited bandwidth.

FIG. 31 illustrates a two-channel implementation of the MML although it can be extrapolated for any number of channels (input signals). The input signals (3101) come from the input circuitry or the linear compensators. The output signals (3111) go to the Distributors. Each delay unit (3102) comprises a buffer and stores a number of samples of its input signal and outputs the maximum absolute value contained in its buffer as (3103). The length of the buffer can be changed to track the range of delays implemented in the distributors by control signals which are not illustrated. The adder (3104) sums these maximum values from each channel. Its output is converted by the response shaper (3105) into a more smoothly varying gain control signal with specified attack and release rates. Before being sent to the Distributors as (3111), in stage (3110) the input signals are each attenuated in accordance with the gain control signal. Preferably, the signals are attenuated in proportion to the gain control signal.

Delays (3109) may be incorporated into the channel signal paths in order to allow gain changes to anticipate peaks.

If oversampling is to be incorporated, it can be placed within the MML, with upsampling stages (3106) followed by anti-image filters (3107-3108). High quality anti-image filters can have considerable group delay in the passband. Using a filter design with less group delay for 3108 can allow the delays 3109 to be reduced or eliminated.

If the Distributors incorporate global ADFs (807), the MML is most usefully incorporated after them in the signal path, splitting the Distributors into separate global and per-SET stages.

The seventh aspect of the invention therefore allows a limiting device which is simple in construction, which effectively prevents clipping and distortion and which maintains the required radiation shaping.

Eighth Aspect of the Invention

The eighth aspect of the invention relates to the method for detecting, and mitigating against the effects of, failed transducers in an array.

The method according to the eighth aspect requires that a test signal is routed to each output transducer of the array which is received (or not) by an input transducer located nearby, so as to determine whether a transducer has failed. The test signals may be output by each transducer in turn or simultaneously, provided that the test signals are distinguishable from one another. The test signals are generally similar to those used in relation to the fourth aspect of the invention already described.

The failure detection step may be carried out initially before setting up a system, for example during a “sound check” or, advantageously, it can be carried out all the time the system is in use, by ensuring that the test signals are inaudible or not noticeable. This is achieved by providing that the test signals comprise pseudo-random noise signals of low amplitude. They can be sent by groups of transducers at a time, these groups changing so that eventually all the transducers send a test signal, or they can be sent by all of the transducers for substantially all of the time, being added to the signal which it is desired to output from the DPAA.

If a transducer failure is detected, it is often desirable to mute that transducer so as to avoid unpredictable outputs. It is then further desirable to reduce the amplitude of output of the transducers adjacent to the muted transducer so as to provide some mitigation against the effect of a failed transducer. This correction may extend to controlling the amplitude of a group of working transducers located near to a muted transducer.

Ninth Aspect of the Invention

The ninth aspect relates to a method for reproducing an audio signal received at a reproducing device such as a DPAA which steers the audio output signals so that they are transmitted mainly in one or a plurality of separate directions.

In general for a DPAA, the amount of delay observed at each transducer determines the direction in which the audio signal is directed. It is therefore necessary for an operator of such a system to program the device so as to direct the signal in a particular direction. If the desired direction changes, it is necessary to reprogram the device.

The ninth aspect of the invention seeks to alleviate the above problem by providing a method and apparatus which can direct an output audio signal automatically.

This is achieved by providing an information signal associated with the audio signal, the information signal comprising information as to how the sound field should be shaped at any particular time. Thus, every time the audio signal is played back, the associated information signal is decoded and is used to shape the sound field. This dispenses with the need for an operator to program where the audio signal must be directed and also allows the direction of audio signal steering to be changed as desired during reproduction of the audio signal.

The ninth aspect of the invention is a sound playback system capable of reproducing one or several audio channels, some or all of which of these channels have an associated stream of time-varying steering information, and a number of loudspeaker feeds. Each stream of steering information is used by a decoding system to control how the signal from the associated audio channel is distributed among the loudspeaker feeds. The number of loudspeaker feeds is typically considerably greater than the number of recorded audio channels and the number of audio channels used may change in the course of a programme.

The ninth aspect applies mainly to reproducing systems which can direct sound in one of a number of directions. This can be done in a plurality of ways:—

Many independent loudspeakers may be scattered around the auditorium and directionality may be obtained by simply routing the audio signal to the loudspeaker nearest to the desired location, or through the several nearest loudspeakers, with the levels and time delays of each signal set to give more accurate localisation at the desired point between speakers;

A mechanically controllable loudspeaker can be used. This approach can involve the use of parabolic dishes around conventional transducers or an ultrasonic carrier to project a beam of sound. Directionality can be achieved by mechanically rotating or otherwise directing the beam of sound; and Preferably, a large number of loudspeakers are arranged in a (preferably 2D) phased array. As described in relation to the other aspects, each loudspeaker is provided with an independent feed and each feed can have its gain, delay and filtering controlled so that beams of sound are projected from the array. The system can project beams to a particular point or make sound appear to come from a point behind the array. A beam of sound may be made to appear to come from a wall of the auditorium by focussing a beam on that wall.

In accordance with the described embodiment, most of the loudspeaker feeds drive a large, two-dimensional array of loudspeakers, forming a phased array. There may also be separate, discrete loudspeakers and further phased arrays around the auditorium.

The ninth aspect comprises associating sound field shaping information with the actual audio signal itself, the shaping information being useable to dictate how the audio signal will be directed. The shaping information can comprise one or more physical positions on which it is desired to focus a beam or at which it is desired to simulate the sound origin.

The steering information may consist of the actual delays to be provided to each replica of the audio signal. However, this approach leads to the steering signal comprising a lot of information.

The steering information is preferably multiplexed into the same data stream as the audio channels. Through simple extension of existing standards, they can be combined into an MPEG stream and delivered by DVD, DVB, DAB or any future transport layer. Further, the conventional digital sound systems already present in cinemas could be extended to use the composite signal of the present invention.

Rather than using steering information which consists of gains, delays and filter coefficients for each loudspeaker feed, it can instead simply describe where the sound is to be focussed or to appear to have come from. During installation in an auditorium, the decoding system is programmed with, or determines by itself, the location of the loudspeaker(s) driven by each loudspeaker feed and the shape of the listening area. It uses this information to derive the gains, delays and filter coefficients necessary to make each channel come from the location described by the steering information. This approach to storing the steering information allows the same recording to be used with different speaker and array configurations and in differently sized spaces. It also significantly reduces the quantity of steering information to be stored or transmitted.

In audio-visual and cinema applications, the array would typically be located behind the screen (made of acoustically transparent material), and be a significant fraction of the size of the screen. The use of such a large array allows channels of sound to appear to come from any point behind the screen which corresponds to the locations of objects in the projected image, and to track the motion of those objects. Encoding the steering information using units of the screen height and width, and informing the decoding system of the location of the screen, will then allow the same steering information to be used in cinemas with different sized screens, while the apparent audio sources remain in the same place in the image. The system may be augmented with discrete (non-arrayed) loudspeakers or extra arrays. It may be particularly convenient to place an array on the ceiling.

FIG. 32 shows a device for carrying out the invention. An audio signal multiplexed with an information signal is input to the terminal 3201 of the de-multiplexer 3207. The de-multiplexer 3207 outputs the audio signal and the information signal separately. The audio signal is routed to input terminal 3202 of decoding device 3208 and the information signal is routed to terminal 3203 of the decoding device 3208. The replicating device 3204 replicates the audio signal input at input terminal 3202 into a number of identical replicas (here, four replicas are used, but any number is possible). Thus, the replicating device 3204 outputs four signals each identical to the signal presented at input terminal 3202. The information signal is routed from terminal 3203 to a controller 3209 which is able to control the amount of delay applied to each of the replicated signals at each of the delay elements 3210. Each of the delayed replicated audio signals are then sent to separate transducers 3206 via output terminal 3205 to provide a directional sound output.

The information comprising the information signal input at the terminal 3203 can be continuously changed with time so that the output audio signal can be directed around the auditorium in accordance with the information signal. This prevents the need for an operator to continuously monitor the audio signal output direction to provide the necessary adjustments.

It is clear that the information signal input to terminal 3203 can comprise values for the delays that should be applied to the signal input to each transducer 3206. However, the information stored in the information signal could instead comprise physical location information which is decoded in the decoder 3209 into an appropriate set of delays. This may be achieved using a look-up table which maps physical locations in the auditorium with a set of delays to achieve directionality to that location. Preferably, a mathematical algorithm, such as that provided in the description of the first aspect of the invention, is used which translates a physical location into a set of delay values.

The ninth aspect of the invention also comprises a decoder which can be used with conventional audio playback devices so that the steering information can be used to provide traditional stereo sound or surround sound. For headphone presentation, the steering information can be used to synthesize a binaural representation of the recording using head-related transfer functions to position apparent sound sources around the listener. Using this decoder, a recorded signal comprising the audio channels and associated steering information can be played back in a conventional manner if desired, say, because no phased array is available.

In this description, an “auditorium” has been referred to. However the described techniques can be applied in a large number of applications including home cinema and music playback as well as in large public spaces.

The above description refers to a system using a single audio input which is played back through all of the transducers in the array. However, the system may be extended to play back multiple audio inputs (again, using all of the transducers) by processing each input separately and thus calculating a set of delay coefficients for each input (based on the information signal associated with that input) and summing the delayed audio inputs obtained for each transducer. This is possible due to the linear nature of the system. This allows separate audio inputs to be directed in different ways using the same transducers. Thus many audio inputs can be controlled to have directivity in particular directions which change throughout a performance automatically.

Tenth Aspect of the Invention

The tenth aspect of the invention relates to a method of designing a sound field output by a DPAA device.

Where a user wishes to specify the radiation pattern, the use of ADFs allows a constrained optimisation procedure many degrees of freedom. A user would specify targets, typically areas of the venue in which coverage should be as even as possible, or should vary systematically with distance, other regions in which coverage should be minimised, possibly at particular frequencies, and further regions in which coverage does not matter. The regions can be specified by the use of microphones or another positioning system, by manual user input, or through the use of data sets from architectural or acoustic modelling systems. The targets can be ranked by priority. The optimisation procedure can be carried out either by within the DPAA itself, in which case it could be made adaptive in response to wind variations, as described above, or as a separate step using an external computer. In general, the optimisation comprises selecting appropriate coefficients for the ADFs to achieve the desired effect. This can be done, for example, by starting with filter coefficients equivalent to a single set of delays as described in the first aspect of the invention, and calculating the resulting radiation pattern through simulation. Further positive and negative beams (with different, appropriate delays) can then be added iteratively to improve the radiation pattern, simply by adding their corresponding filter coefficients to the existing set.

Further Preferable Features

There may be provided means to adjust the radiation pattern and focussing points of signals related to each input, in response to the value of the programme digital signals at those inputs—such an approach may be used to exaggerate stereo signals and surround-sound effects, by moving the focussing point of those signals momentarily outwards when there is a loud sound to be reproduced from that input only. Thus, the steering can be achieved in accordance with the actual input signal itself.

In general, when the focus points are moved, it is necessary to change the delays applied to each replica which involves duplicating or skipping samples as appropriate. This is preferably done gradually so as to avoid any audible clicks which may occur if a large number of samples are skipped at once for example.

Practical applications of this invention's technology include the following:

for home entertainment, the ability to project multiple real sources of sound to different positions in a listening room allows the reproduction of multi-channel surround sound without the clutter, complexity and wiring problems of multiple separated wired loudspeakers;

for public address and concert sound systems, the ability to tailor the radiation pattern of the DPAA in three dimensions, and with multiple simultaneous beams allows:

much faster set-up as the physical orientation of the DPAA is not very critical and need not be repeatedly adjusted;

smaller loudspeaker inventory as one type of speaker (a DPAA) can achieve a wide variety of radiation patterns which would typically each require dedicated speakers with appropriate horns;

better intelligibility, as it is possible to reduce the sound energy reaching reflecting surfaces, hence reducing dominant echoes, simply by the adjustment of filter and delay coefficients; and better control of unwanted acoustic feedback as the DPAA radiation pattern can be designed to reduce the energy reaching live microphones connected to the DPAA input;

for crowd-control and military activities, the ability to generate a very intense sound field in a distant region, which field is easily and quickly repositionable, by focussing and steering of the DPAA beams (without having physically to move bulky loudspeakers and/or horns) and which is easily directed onto the target by means of tracking light sources, and provides a powerful acoustic weapon which is nonetheless non-invasive; if a large array is used, or a group of coordinated separate DPAA panels possibly widely spaced, then the sound field can be made much more intense in the focal region than near the DPAA SETs (even at the lower end of the Audio Band if the overall array dimensions are sufficiently large).

The invention claimed is:

1. A method of causing plural input signals representing respective channels to appear to emanate from respective different positions in space, said method comprising:

providing a sound reflective or resonant surface at each of said positions in space;

providing, in one enclosure, an array of at least 6 output transducers distal from said positions in space; and directing, using said array of output transducers, sound waves of each channel towards the respective position in space to cause said sound waves to be re-transmitted by said reflective or resonant surface;

said step of directing comprising:

obtaining, in respect of each transducer, a delayed replica of each input signal delayed by a respective delay selected in accordance with the position in the array of the respective output transducer and said respective position in space such that replicas for transducers closer to the respective position in space are delayed more than replicas for transducers further from the position in space such that the sound waves of the channel are directed towards the position in space in respect of that channel;

summing, in respect of each transducer, the respective delayed replicas of each input signal to produce an output signal; and routing the output signals to the respective transducers.

2. A method according to claim 1, wherein said step of obtaining, in respect of each output transducer, a delayed replica of the input signal comprises:

replicating said input signal to obtain a replica signal in respect of each output transducer;

delaying each replica of said input signal by said respective delay selected in accordance with the position in the array of the respective output transducer and said respective position in space.

3. A method according to claim 1 further comprising:

calculating, before said delaying step, the respective delays in respect of each input signal replica by:

determining the distance between each output transducer and the position in space in respect of that input signal;

deriving respective delay values such that the sound waves from each transducer for a single channel arrive at said position in space simultaneously.

4. A method according to claim 1 further comprising:

inverting one of said plural input signals;

obtaining, in respect of each output transducer, a delayed replica of said inverted input signal delayed by a respective delay selected in accordance with the position in the array of the respective transducer, so that sound waves derived from said inverted input signal are directed at a position in space so as to cancel out at least partially sound waves derived from that input signal at that position in space.

5. A method according to claim 4, wherein said step of obtaining, in respect of each output transducer, a delayed replica of said inverted input signal comprises:

replicating said inverted input signal to obtain a replica signal in respect of each output transducer;

delaying each replica of said inverted input signal by a respective predetermined delay selected in accordance with the position in the array of the respective output transducer.

6. A method according to claim 4, wherein said inverted input signal is scaled so that the sound waves derived from said inverted input signal cancel sound waves derived from that input signal at said position in space.

7. A method according to claim 6, wherein said scaling is selected by determining, in respect of the input signal which has been inverted, the magnitude of sound waves at said position in space and selecting said scaling so that sound waves derived from said inverted input signal have the same magnitude at that position.

8. A method according to claim 1, wherein at least one of said surfaces is provided by a wall of a room or other permanent structure.

9. An apparatus for causing plural input signals representing respective channels to appear to emanate from respective different positions in space, said apparatus comprising:

a sound reflective or resonant surface at each of said positions in space;

an array of at least 6 output transducers in a single enclosure distal from said positions in space; and a controller for directing, using said array of output transducers, sound waves of each channel towards that channel's respective position in space such that said sound waves are re-transmitted by said reflective or resonant surface;

said controller comprising:

replication and delay means arranged to obtain, in respect of each transducer, a delayed replica of the input signal delayed by a respective delay selected in accordance with the position in the array of the respective output transducer and said respective position in space such that replicas for transducers closer to the respective position in space are delayed more than replicas for transducers further from the position in space such that the sound waves of the channel are directed towards the position in space in respect of that input signal;

adder means arranged to sum, in respect of each transducer, the respective delayed replicas of each input signal to produce an output signal; and means to route the output signals to the respective transducers such that the channel sound waves are directed towards the position in space in respect of that input signal.

10. An apparatus according to claim 9, wherein said controller further comprises:

calculation means for calculating the respective delays in respect of each input signal replica by:

determining the distance between each output transducer and the position in space in respect of that input signal;

deriving respective delay values such that the sound waves from each transducer for a single channel arrive at said position in space simultaneously.

11. An apparatus according claim 10, wherein at least one of said surfaces is a wall of a room or other permanent structure.

12. An apparatus according to claim 9, wherein said controller further comprises:

an inverter for inverting one of said plural input signals;

second replication and delay means arranged to obtain, in respect of each output transducer, a delayed replica of said inverted input signal delayed by a respective delay selected in accordance with the position in the array of the respective transducer and a second position in space so that sound waves derived from said inverted input signal are directed at said second position in space so as to cancel out at least partially sound waves derived from that input signal at said second position in space.

13. An apparatus according to claim 12, wherein said controller further comprises a scaler for scaling said inverted input signal so that the sound waves derived from said inverted input signal cancel sound waves derived from that input signal at said second position in space.

14. An apparatus according to claim 9, wherein said surfaces are reflective and have a roughness on the scale of a wavelength of sound frequency it is desired to diffusely reflect.

15. An apparatus according to claim 9, wherein said surfaces are optically-transparent.

16. An apparatus for causing plural input signals representing respective channels to appear to emanate from respective different positions in space, for use with reflective or resonant surfaces at each of said positions in space, said apparatus comprising:

an array of at least 6 output transducers in a single enclosure distal from said positions in space; and a controller for directing, using said array of output transducers, sound waves of each channel towards that channel's respective position in space such that said sound waves are retransmitted by said reflective or resonant surface;

said controller comprising:

replication and delay means arranged to obtain, in respect of each transducer, a delayed replica of the input signal delayed by a respective delay selected in accordance with the position in the array of the respective output transducer and said respective position in space such that replicas for transducers closer to the respective position in space are delayed more than replicas for transducers further from the position in space such that the sound waves of the channel are directed towards the position in space in respect of that input signal;

adder means arranged to sum, in respect of each transducer, the respective delayed replicas of each input signal to produce an output signal; and means to route the output signals to the respective transducers such that the channel sound waves are directed towards the position in space in respect of that input signal.

17. An apparatus according to claim 16, wherein said controller further comprises:

calculation means for calculating the respective delays in respect of each input signal replica by:

determining the distance between each output transducer and the position in space in respect of that input signal;

deriving respective delay values such that the sound waves from each transducer for a single channel arrive at said position in space simultaneously.

18. An apparatus according to claim 16, wherein said controller further comprises:

an inverter for inverting one of said plural input signals;

second replication and delay means arranged to obtain, in respect of each output transducer, a delayed replica of said inverted input signal delayed by a respective delay selected in accordance with the position in the array of the respective transducer and a second position in space so that sound waves derived from said inverted input signal are directed at said second position in space so as to cancel out at least partially sound waves derived from that input signal at said second position in space.

19. An apparatus according to claim 18, wherein said controller further comprises:

an inverter for inverting one of said plural input signals;

second replication and delay means arranged to obtain, in respect of each output transducer, a delayed replica of said inverted input signal delayed by a respective delay selected in accordance with the position in the array of the respective transducer and a second position in space so that sound waves derived from said inverted input signal are directed at said second position in space so as to cancel out at least partially sound waves derived from that input signal at said second position in space.

* * * * *

UNITED STATES PATENT AND TRADEMARK OFFICE

CERTIFICATE OF CORRECTION

PATENT NO. : 7,577,260 B1
APPLICATION NO. : 10/089025
DATED : August 18, 2009
INVENTOR(S) : Hooley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1185 days.

Signed and Sealed this

Seventh Day of September, 2010

David J. Kappos
*Director of the United States Patent and Trademark Office*